(12) United States Patent
Kakarlapudi et al.

(10) Patent No.: US 10,013,790 B2
(45) Date of Patent: Jul. 3, 2018

(54) EXECUTING CONDITIONAL TASKS IN A GRAPHICS PROCESSING PIPELINE

(71) Applicant: ARM Limited, Cambridge (GB)

(72) Inventors: Sandeep Kakarlapudi, Trondheim (NO); Andreas Due Engh-Halstvedt, Trondheim (NO); Lars Oskar Flordal, Uppsala (SE); Arne Bergene Fossaa, Trondheim (NO)

(73) Assignee: Arm Limited, Cambridge (GB)

( * ) Notice: Subject to any disclaimer, the term of this patent is extended or adjusted under 35 U.S.C. 154(b) by 95 days.

(21) Appl. No.: 15/042,540

(22) Filed: Feb. 12, 2016

(65) Prior Publication Data
US 2016/0239939 A1     Aug. 18, 2016

(30) Foreign Application Priority Data

Feb. 18, 2015 (GB) .................................. 1502705.5

(51) Int. Cl.
*G06T 11/40* (2006.01)
*G06T 15/00* (2011.01)

(52) U.S. Cl.
CPC ............ *G06T 15/005* (2013.01); *G06T 11/40* (2013.01)

(58) Field of Classification Search
CPC .......... G06T 15/005; G06T 11/40; G06T 1/20
See application file for complete search history.

(56) References Cited

U.S. PATENT DOCUMENTS 8,736,624 B1 * 5/2014 Mahan .................. G06T 15/005
345/522

OTHER PUBLICATIONS

GB Search Report dated Aug. 6, 2015, GB Patent Application No. GB1502705.5.

* cited by examiner

*Primary Examiner* — Maurice L McDowell, Jr.
*Assistant Examiner* — Donna J Ricks
(74) *Attorney, Agent, or Firm* — Vierra Magen Marcus LLP

(57) ABSTRACT

In a graphics processing system, a driver for the graphics processing pipeline can include conditional graphics processing tasks in the graphics processing tasks that are to be executed by the graphics processing pipeline to generate a render output required by an application. Each such conditional task has associated with it a condition to be used by the graphics processing pipeline to determine whether to execute processing for the task or not and a region of the render output over which the processing for the task will be executed when the condition for the task is met. The graphics processing pipeline determines whether the condition associated with the task has been met, and only executes the processing for the task if the condition associated with the task has been met.

22 Claims, 8 Drawing Sheets

EXECUTING CONDITIONAL TASKS IN A GRAPHICS PROCESSING PIPELINE

BACKGROUND

The technology described herein relates to graphics processing systems.

Some graphics processing operations render a first output, e.g. frame, and then perform further processing on that first output to provide the desired, "final" output, e.g. frame.

An example of this is so-called "incremental rendering" in which an, e.g. frame, is first rendered, and then some additional, "incremental", rendering is done on top of that frame to provide the final output frame. This may be used, e.g., to overlay a user-interface, captions, or similar on frames of video being displayed; when an application is switching between temporary surfaces; and/or to control memory usage for storing transformed primitives, etc.

In incremental rendering, the incremental rendering pass can overwrite some areas of the existing frame, but preserve other areas of it. It is not usually possible therefore simply to render the "incremental" geometry on its own, but rather the incremental geometry must be rendered on top of the existing frame that it is to be applied to (and then the so-modified frame is provided as the output frame). The effect of this then is that before the incremental geometry is rendered, the previously generated frame that it is to be applied to must be read back into the graphics processing pipeline (so that the incremental geometry can then be rendered "on top of" that existing frame).

This is particularly the case for tile-based graphics processing systems. In this case, when a given output frame is to be incrementally rendered, for each tile, the "base" frame content for that tile must first be loaded into the graphics processing pipeline, with the incremental geometry then being rendered on top of that "base" tile content, and the resulting, incrementally rendered, tile then written out, e.g. to main memory.

To facilitate this, a graphics processor may include a "pre-load" unit that is operable to load a previously generated frame from a frame buffer (e.g. in main memory), and/or a first rendering pass that uses a full screen primitive (polygon) to read in the previously generated frame may be performed, before the incremental rendering pass.

The Applicants believe that there remains scope for improvements to the operation of graphics processing systems for operations such as incremental rendering (and otherwise).

BRIEF DESCRIPTION OF THE DRAWINGS

A number of embodiments of the technology described herein will now be described by way of example only and with reference to the accompanying drawing, in which.

Like reference numerals are used for like components where appropriate in the drawings.

DETAILED DESCRIPTION

Figure 1:
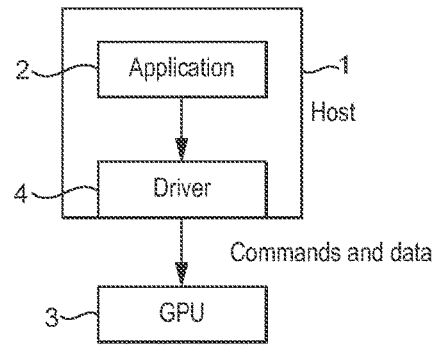
FIG. 1 shows schematically an exemplary computer graphics processing system.

A first embodiment of the technology described herein comprises a method of operating a graphics processing system that includes a graphics processing pipeline, the method comprising:

when the graphics processing pipeline is to generate a render output:

instructing the graphics processing pipeline to execute a task that has associated with it a condition to be used by the graphics processing pipeline to determine whether to execute processing for the task or not and a region of the render output over which the processing for the task will be executed when the condition for the task is met;

the graphics processing pipeline determining whether the condition associated with the task has been met; and the graphics processing pipeline, when it determines that the condition associated with the task has been met, executing the processing for the task over the region of the render output associated with the task.

A second embodiment of the technology described herein comprises a graphics processing pipeline comprising processing circuitry configured to:

when the graphics processing pipeline is instructed to execute a task that has associated with it a condition to be used by the graphics processing pipeline to determine whether to execute processing for the task or not and a region of the render output over which the processing for the task will be executed when the condition for the task is met:

determine whether the condition associated with the task has been met; and when it is determined that the condition associated with the task has been met, trigger the execution of the processing for the task over the region of the render output associated with the task by the graphics processing pipeline.

In the technology described herein, a graphics processing task to be executed when generating a render output has an associated condition that is used to trigger the execution of processing for the task (or not). When it is determined that the condition is met, the task's processing is executed over a region of the render output that is associated with the task. As will be discussed further below, this can facilitate performing operations such as incremental rendering in a more efficient manner, particularly (but not exclusively) in tile-based graphics processing systems.

The render output that is being generated can be any suitable and desired render output that a graphics processing system can generate. In one embodiment, it is a frame for display, but it could also be other forms of graphics processing output, such as a graphics texture (in a render-to-texture operation), etc. The output is, in an embodiment, an image.

In one embodiment, the graphics processing pipeline is incrementally rendering a previously generated render output, e.g. frame (and thus the render output that is being generated is an incrementally rendered frame).

The task that has an associated condition that the graphics processing pipeline is instructed to execute can be any suitable and desired task that can be provided to a graphics processing pipeline.

The task has associated with it a region of the render output over which the processing for the task will be executed when the condition for the task is met. The region of the render output over which the processing for the task will be executed can be any suitable and desired size and shape. It is, in an embodiment, a rectangular region of the render output. Other arrangements would, of course, be possible.

The render output region that the task is to be performed over can be indicated by indicating the region for the task explicitly, e.g. by identifying particular objects, primitives, and/or vertices, etc. to be processed for the task, but in another embodiment the region is indicated implicitly. For example, the region for the task could be set so as to cover whatever area of the render output is being processed (such as a rendering tile). Thus, e.g., if the task is triggered a primitive to be rasterised and rendered that covers for each fragment (e.g. pixel and/or sampling) position that the task is to be performed for (relates to) and/or fragments to be rendered for each fragment (e.g. pixel and/or sampling) position that the task is to be performed for (relates to) will be issued (for processing) to the relevant stage or stages of the graphics processing pipeline.

The region of the render output that is to be processed for the task could be the entire area of the output (e.g. the frame), or the region could cover only some but not all of the overall render output (e.g. frame). For example, the render output (e.g. frame) could be divided into smaller sub-areas with the region for the task then having the size of one of the smaller sub-areas. Thus, for example, in a tile-based graphics processing system, the region for the task could, and in an embodiment does, cover a (single) tile, although it could equally cover plural tiles and/or only a sub-tile, if desired. In an embodiment the region for the task at least covers the entire area of the render output that the graphics processing pipeline processes at any one time (thus a rendering tile in a tile-based graphics processing system).

Where the region of the render output that is to be processed for the task is only a sub-area of the render output (e.g. a rendering tile), then where the task is (potentially) repeated for plural sub-areas so as to be applied ultimately to the entire render output (as would, e.g., typically be the case in a tile-based graphics processing system), then the processing for the conditional task will be executed respectively for each sub-area that is processed (if the task's condition is met for that sub-area). Thus in an embodiment, the region of the render output that is to be processed for a conditional task comprises a "relative" region of the render output (such as encompassing a rendering tile) that can respectively be applied to any absolute position within the render output, rather than defining an absolute region within the render output that the task is to be processed for. This would then allow the same "generic" conditional task to be applied to plural regions (e.g. rendering tiles) within a render output being generated, without having to redefine the render output region for the conditional task individually for each sub-area of the render output being considered.

The processing of the region that is to be processed for the task in one embodiment is achieved by processing a single primitive that covers the desired render output area (and is thus, in an embodiment, a full-frame primitive, or a full-tile primitive, for example) (although it is not necessary for the "primitive" to actually be generated—instead fragments corresponding to such a primitive could be issued to the pipeline directly, if desired (and in one embodiment, this is what is done)).

The processing that the render output region is to be subjected to for the task can be any suitable and desired processing (e.g., and in an embodiment, that a render output region can be subjected to in the graphics processing pipeline). It in an embodiment comprises performing a given processing operation or operations in respect of the render output region for the task, and in an embodiment comprises processing a, and in an embodiment plural, and in an embodiment each, sampling position within the area covered by the render output region (and in an embodiment subjecting each sampling position to be processed to the same, corresponding processing operation or operations). The processing in an embodiment comprises rendering the fragments and/or sampling positions covered by (for) the render output region for the task. It may also comprise performing rasterisation over the render output region for the task, e.g., and, in an embodiment, to generate fragments for rendering for the task. It may comprise only rendering, e.g. fragments, over the render output region for the task or may comprise both rasterisation and rendering over the render output region for the task.

In an embodiment, the processing that the render output region is to be subjected to for the task comprises performing fragment processing but not geometry processing for (over) the render output region for the task (e.g. rendering fragments for the render output region for the task directly, without any prior "geometry" processing).

Thus, in an embodiment the processing for the conditional task comprises work to be done over fragments in the region associated with the task, and, in an embodiment, fragment shading. It, in an embodiment, includes at least one of, and, in an embodiment, all of fragment shading, per-fragment tests and blending. In an embodiment, it also or instead includes rasterisation.

Correspondingly, in an embodiment, the processing for the conditional task does not include any geometry shading. In an embodiment, the processing for the conditional task does not include at least one of, and, in an embodiment, does not include any of: vertex transformation, vertex shading, tessellation, geometry shading, primitive set-up, and clipping.

The processing for the conditional task over the render output region can be performed by any suitable stage or element of the graphics processing system and pipeline. In an embodiment, the processing is performed by the appropriate graphics processing pipeline stages (thus in an embodiment from the rasterisation or rendering stage onwards).

In one embodiment, the processing operation for the task comprises reading previously generated data values and storing them for use with a subsequent rendering operation (thus, e.g., and, in an embodiment, reading and storing a previously generated data value for each sampling position within the area covered by the region for the task). This may be used, e.g., and, in an embodiment, to load, e.g., colour and/or depth values for a previously generated frame back into an, e.g. buffer of the graphics processing pipeline, for further processing, e.g. in an incremental rendering operation. In this case, the task, in an embodiment, loads one type of data value (e.g. colour or depth) only, although it could load plural types of data values if required.

In an embodiment, the processing operation that the conditional task executes comprises processing of data that is generated by the graphics processing pipeline when generating the render output, such as, for example, filtering (e.g. downsampling), compressing or otherwise encoding, and/or averaging, data that is generated when generating the render output. This could be used, for example, to conditionally downsample or otherwise filter data that is generated when rendering a given render output, and may be as well as or instead of loading data, for example.

In an embodiment, the task also indicates the processing that the render output region for the task is to be subjected to. This can be indicated in any suitable and desired manner.

The task, in an embodiment, also indicates the order in which its processing is to be executed relative to other tasks that are to be performed when generating the render output. For example, the task, in an embodiment, indicates whether its processing should be performed before or after other tasks and/or geometry that are to be processed for the render output.

The entire processing operation for the conditional task could be dependent upon, and only performed, when the condition for the task is met (and in one embodiment, this is the case).

However, it would also be possible for only some of the task processing to be dependent upon the condition, with other processing for the task being performed irrespective of whether the task's condition is met or not. For example, a primitive corresponding to the render output region for the task could be rasterised, e.g. to generate fragments for the tasks, but those fragments then only rendered (or sent onwards in the pipeline) if the task's condition is met.

This may depend, e.g., on the nature of the condition for the task and/or on the processing that the task is to carry out. Thus, in an embodiment, some processing for the task is performed irrespective of (and, in an embodiment, before) it is determined whether the condition for the task has been met, with further processing for the task then being performed when (and only when) it is determined that the condition for the task has been met.

The task and its associated render output region, condition, processing, etc., can be provided to the graphics processing pipeline in any suitable and desired form. In an embodiment, the task is provided as a "shader" (a graphics shading program) that is to be executed by the graphics processing pipeline if the task's condition is met.

The graphics processing pipeline can be instructed to execute the conditional task in any suitable and desired manner. In one embodiment this is done by including an appropriate command to execute the task in the set of commands that is provided to the graphics processing pipeline for generating the desired render output.

Thus, in an embodiment an instruction (a command) to execute a particular shader that has a condition associated with it is sent to the graphics processing pipeline. The condition that is associated with the conditional task is, in an embodiment, indicated in the instruction (command) to execute the conditional task (e.g. the conditional shader). In an embodiment, a set of configuration bits can be set in the instruction to indicate the condition.

The command is, in an embodiment, in the form of a descriptor for the conditional task (or tasks), that is, e.g., included in the overall set of "job" descriptors for the graphics processing pipeline. For example, a conditional task could be defined using a draw call descriptor and a given field in the draw call descriptor (or otherwise) could indicate the condition for the task. In an embodiment, there is an overall "fragment job descriptor" that describes all the fragment processing to be done (including, e.g., which primitive list to read primitives from) when generating a render output, and one (or more) of the descriptor fields used for the fragment job can include a pointer or pointers to point to a draw call descriptor for a conditional task and to configuration bits that indicate the condition for the conditional task.

In an embodiment, the condition or conditions that is or are associated with a conditional task can be configured (set) in use. For example, and, in an embodiment, there could be a number of sets of predetermined conditions that can be associated with conditional tasks with an indicator, such as a set of configuration bits, then being set appropriately to indicate the condition for the task in question.

The instruction to execute the task can be provided to the graphics processing pipeline, and the task can be configured for provision to the graphics processing pipeline, by any suitable and desired element or stage of the overall graphics processing system that the graphics processing pipeline belongs to.

The instruction to execute the conditional task that is provided to the graphics processing pipeline should be, and is, in an embodiment, generated automatically by operation of the graphics processing system rather than, e.g., being explicitly requested by the application that requires the rendering output. Thus, in particular, the operation in the manner of the technology described herein to provide an instruction to execute a conditional task to the graphics processing pipeline is, in an embodiment, triggered by, e.g. an element of the graphics processing system, identifying from graphics processing commands received from an application that requires graphics processing to generate a render output whether to include a conditional graphics processing task in the graphics processing tasks that are to be executed by the graphics processing pipeline to generate the render output required by the application, with the graphics processing commands from the application that this determination is made from (in an embodiment) not comprising graphics processing commands that in themselves indicate any task that has a condition associated with it. Thus, the conditional tasks in the manner of the technology described herein are distinct from, and in addition to, any "conditional" processing tasks that an application requiring a render output may explicitly indicate (if any).

Thus, the need to include a conditional graphics processing task in the graphics processing tasks that are to be executed by the graphics processing pipeline is, in an embodiment, determined from the graphics processing commands that do not relate to any form of conditional task received from an application that requires graphics processing to generate a render output.

In an embodiment, a driver for the graphics processing pipeline (that is, e.g., executing on a host CPU that the graphics processing pipeline is associated with) configures the task and instructs the graphics processing pipeline to execute it. In an embodiment the, e.g. driver, is configured to identify, e.g. from the commands for graphics processing it receives (e.g. from an application (via an API (application program interface)) that requires graphics processing), whether a conditional task in the manner of the technology described herein is required, and to, if so, include such a task (with an appropriate condition) in the set of tasks that it instructs the graphics processing pipeline to execute when generating the render output.

The technology described herein also extends to such operation (the provision of "conditional" tasks to a graphics processing pipeline). Thus, another embodiment of the technology described herein comprises a method of providing tasks for generating a render output to a graphics processing pipeline, the method comprising:

determining from graphics processing commands received from an application that requires graphics processing to generate a render output, whether to include a conditional graphics processing task in the graphics processing tasks that are to be executed by a graphics processing pipeline to generate the render output required by the application; and when it is determined to include a conditional graphics processing task in the graphics processing tasks that are to be executed by a graphics processing pipeline to generate the render output required by the application, instructing a graphics processing pipeline to execute a set of one or more graphics processing tasks to cause the graphics processing pipeline to generate the render output required by the application, with at least one of the tasks in the set of tasks having associated with it a condition to be used by the graphics processing pipeline to determine whether to execute processing for the task or not and a region of the render output over which the processing for the task will be executed when the condition for the task is met.

Another embodiment of the technology described herein comprises an apparatus for providing tasks for generating a render output to a graphics processing pipeline, the apparatus comprising processing circuitry configured to:

determine from graphics processing commands received from an application that requires graphics processing to generate a render output, whether to include a conditional graphics processing task in the graphics processing tasks that are to be executed by a graphics processing pipeline to generate the render output required by the application; and to:

when it is determined to include a conditional graphics processing task in the graphics processing tasks that are to be executed by a graphics processing pipeline to generate the render output required by the application, instruct a graphics processing pipeline to execute a set of one or more graphics processing tasks to cause the graphics processing pipeline to generate the render output required by the application, with at least one of the tasks in the set of tasks having associated with it a condition to be used by the graphics processing pipeline to determine whether to execute processing for the task or not and a region of the render output over which the processing for the task will be executed when the condition for the task is met.

The technology described herein correspondingly also extends to the overall graphics processing system (and its operation when performing the technology described herein).

Another embodiment of the technology described herein comprises a graphics processing system comprising:

a host processor for providing tasks for generating a render output to a graphics processing pipeline; and a graphics processing pipeline for generating render outputs in response to tasks received from the host processor; wherein:

the host processor comprises processing circuitry configured to:

determine from graphics processing commands received from an application executing on the host processor that requires graphics processing to generate a render output, whether to include a conditional graphics processing task in the graphics processing tasks that are to be executed by the graphics processing pipeline to generate the render output required by the application; and to:

when it is determined to include a conditional graphics processing task in the graphics processing tasks that are to be executed by the graphics processing pipeline to generate the render output required by the application, instruct the graphics processing pipeline to execute a set of one or more graphics processing tasks to cause the graphics processing pipeline to generate the render output required by the application, with at least one of the tasks in the set of tasks having associated with it a condition to be used by the graphics processing pipeline to determine whether to execute processing for the task or not and a region of the render output over which the processing for the task will be executed when the condition for the task is met; and the graphics processing pipeline comprises processing circuitry configured to:

when the graphics processing pipeline is instructed to execute a task that has associated with it a condition to be used by the graphics processing pipeline to determine whether to execute processing for the task or not and a region of the render output over which the processing for the task will be executed when the condition for the task is met:

determine whether the condition associated with the task has been met; and when it is determined that the condition associated with the task has been met, trigger the execution of the processing for the task over the region of the render output associated with the task by the graphics processing pipeline.

Another embodiment of the technology described herein comprises a method of operating a graphics processing system comprising a host processor for providing tasks for generating a render output to a graphics processing pipeline, and a graphics processing pipeline for generating render outputs in response to tasks received from the host processor, the method comprising:

the host processor:

determining from graphics processing commands from an application that requires graphics processing to generate a render output, whether to include a conditional graphics processing task in the graphics processing tasks that are to be executed by the graphics processing pipeline to generate the render output required by the application; and when it is determined to include a conditional graphics processing task in the graphics processing tasks that are to be executed by the graphics processing pipeline to generate the render output required by the application, instructing the graphics processing pipeline to execute a set of one or more graphics processing tasks to cause the graphics processing pipeline to generate the render output required by the application, with at least one of the tasks in the set of tasks having associated with it a condition to be used by the graphics processing pipeline to determine whether to execute processing for the task or not and a region of the render output over which the processing for the task will be executed when the condition for the task is met; and the graphics processing pipeline when it is instructed to execute a task that has associated with it a condition to be used by the graphics processing pipeline to determine whether to execute processing for the task or not:

determining whether the condition associated with the task has been met; and when it is determined that the condition associated with the task has been met, executing the processing for the task over the region of the render output associated with the task.

As will be appreciated by those skilled in the art, all these embodiments of the technology described herein can and in an embodiment do include any one or more or all of the embodiments of the technology described herein. Thus, for example, the determination and inclusion of the conditional task is, in an embodiment, performed by a driver for the graphics processing pipeline.

The determination of whether to make one of the tasks that is executed by the graphics processing pipeline a conditional task can be based on any desired and suitable criteria. In an embodiment, if the graphics processing commands received from the application meet a particular, in an embodiment selected, condition or conditions, then a "conditional task" is used. The condition or conditions, in an embodiment, correspond to and indicate that a particular type of rendering operation, such as incremental rendering, is required. This can be identified from the commands that are received. For example, if the commands for generating the render output do not begin with a "frame buffer clear" command, that can indicate that incremental rendering is being performed. Thus, in an embodiment, it is determined whether the commands for generating the render output begin with a command to clear the frame buffer, and when they do not, a conditional task is included in the set of tasks to be executed by the graphics processing pipeline.

While it would be possible for the task that has the associated condition to be the only task that is (potentially) to be performed by the graphics processing pipeline to generate the render output, in an embodiment, the conditional task is one of a set of plural tasks that are to be performed by the graphics processing pipeline to generate the render output. In this case there will be two or more tasks. In these arrangements there may be (and in one embodiment is) two or more tasks that have associated conditions in the manner of the technology described herein in the set of tasks to be performed. Thus, in an embodiment, two (or more) "conditional" tasks are provided to the graphics processing pipeline (and the graphics processing pipeline executes those tasks when their respective conditions are met).

Where two or more conditional tasks are provided to the graphics processing pipeline for a given render output, then in an embodiment plural, and in an embodiment each, of those conditional tasks have the same (or a corresponding) region of the render output associated with them.

It would be possible for each task in a set of plural tasks to be executed to generate a render output to be conditional tasks in the manner of the technology described herein (and in one embodiment, this is the case). However, in another embodiment, where there is a set of plural tasks to be performed, only some but not all (e.g. only one) of the tasks in the set of tasks are "conditional" tasks. Thus, in an embodiment, a set of plural tasks that includes both a "conditional" task or tasks in the manner of the technology described herein, and one or more other tasks, is provided to the graphics processing pipeline for the purpose of generating the render output.

In this case, the other, "non-conditional" tasks are, in an embodiment, "normal" graphics processing tasks (such as shaders) that indicate geometry to be processed (and, e.g., the processing that the geometry is to be subjected to) but which do not have any associated condition(s) that must be tested (and met) for the task to be performed by the graphics processing pipeline. Thus, the "non-conditional" tasks, in an embodiment, trigger the "conventional" processing (rasterising and rendering) of the geometry that is associated with them.

As discussed above, in an embodiment, the "conditional tasks" can, and in an embodiment do, indicate whether their associated fragments should be processed before or after, e.g. the geometry (e.g. fragments) for, a (or any) "normal" tasks that are also to be performed to generate the render output (if their conditions are met).

In an embodiment, there is a limit on the number of conditional tasks that can be included in a set of plural tasks that can be provided to a graphics processing pipeline to generate a render output. In an embodiment, up to three conditional tasks can be used for any given render output. In this case, there are in an embodiment two conditional tasks that will, if triggered, be processed before a "non-conditional" task, and in an embodiment before all of the "non-conditional" tasks, in the set of tasks, and one conditional task that will, if triggered, be processed after a "non-conditional" task, and in an embodiment after all of the "non-conditional" tasks, in the set of tasks.

In an embodiment, a conditional task that is to be executed before a "non-conditional" task is a task that loads data (if its conditions are met (which data is, in an embodiment, then be processed by the subsequent "non-conditional" task)). A conditional task that is to be performed after a "non-conditional" task is, in an embodiment, a task that operates to perform some processing on the output of a previously executed non-conditional task, such as to downsample or otherwise filter the result of the non-conditional task.

In one embodiment, there is a predetermined set of one or more conditional tasks that the graphics processing pipeline can be instructed to execute. In this case, the graphics processing pipeline can be instructed to execute one of the predetermined conditional tasks by the inclusion of an appropriate command for the task in the set of commands that are sent to the graphics processing pipeline when it is to generate a render output.

In an embodiment, the conditional tasks are configured (e.g., and in an embodiment, by the driver), in use ("on the fly"). This then allows the conditional task to be configured flexibly for the particular processing that is required (it can allow multiple colour values to be loaded at each, e.g. pixel, if the frame buffer is configured to use multiple colour render targets, for example).

Other arrangements would, of course, be possible.

The conditions that can be associated with a task to trigger (or not) its execution by the graphics processing pipeline can be any desired and suitable conditions on which a determination as to whether or not to execute a task can be based. The condition or conditions associated with a task, in an embodiment, relate to whether the execution of the task is actually needed to generate the render output or not.

A given conditional task may have only one condition associated with it that is considered to determine whether to execute the task (and in one embodiment, this is the case), or it may have plural conditions associated with it, if desired.

In an embodiment, there is a set of particular, in an embodiment predefined, in an embodiment predetermined, conditions that can be associated with tasks for the purposes of the technology described herein. A condition can then be associated with a task either by including the relevant condition in the description of the task itself, or by including the condition or an indicator of (e.g. a pointer to) the condition in the instruction (command) that is provided to the graphics processing pipeline to instruct it to execute the task in question.

In an embodiment, a condition that is associated with a task has an area of the render output associated with it, such that the condition is met if the area in question meets the requirement for the condition. For example, the condition could be whether any geometry associated with other (non-conditional) tasks to be executed for the render output falls within a particular area of the render output (such as a tile being processed in a tile-based graphics processing system).

This will then allow, for example, the execution of the conditional task to be dependent upon particular properties of given areas of the render output, so as, for example, to allow conditional processing of a set of sampling points within a given area of the render output to be triggered if a particular area of the render output meets a particular condition.

In these arrangements, the area of the render output over which the condition is to be tested can be any suitable and desired area of the render output. It could be a single sampling position of the render output, but is in an embodiment a region of plural sampling positions of the render output. It could be the complete render output area (e.g. frame), but in another embodiment is only some but not all of the render output. For example, the test could be whether a given smaller region of the render output meets the condition. In an arrangement, the test for the condition is whether the area of the render output that is currently being processed (thus e.g. a rendering tile) meets the condition in question. Thus, in the case of a tile-based graphics processing pipeline, in an embodiment the condition is tested for the tile that is currently being processed, and if it is met for that tile, then the conditional task is executed (in an embodiment for the entire tile) (but not otherwise).

It would also be possible for the condition to relate, e.g., to something other than a tile, such as a set of plural tiles or only part of a tile or tiles (a sub-tile or sub-tiles). It would also be possible for a given conditional task to have a "customisable" (configurable in use) area (geometry) associated with it over which the condition is tested. This could be indicated, for example, by using the stencil buffer or in any other suitable manner.

In an embodiment, the area of the render output over which the condition is tested corresponds to the area that the associated render output region for the task in question relates to (covers). Thus, for example, where the render output region associated with a conditional task is a tile in a tile-based graphics processing system, the condition for the conditional task is, in an embodiment, tested for the tile as well. However, this is not essential, and it would be possible, for example, to test the condition for a region of the render output that does not match the region that the conditional task will then be executed for. This would then allow, for example, a condition being met for a smaller region of the render output to trigger the execution of the conditional task over a larger region of the render output, and vice-versa, if desired.

In general, the condition for the conditional task will be tested for an area of the render output, and then trigger (when the condition is met) the execution of the conditional task over the task's associated region of the render output. In an embodiment, the region of the render output that the conditional task is executed over encloses the area of the render output over which the condition for the task is tested, and is, in an embodiment, a rectangular region that matches or encloses the area of the render output over which the task's condition is tested.

In an embodiment, the or a condition that is associated with a conditional task is a condition that is dependent upon a result of processing "real" geometry for the render output being generated, i.e. a result of processing geometry for a non-conditional task that is to be executed when generating the render output. In an embodiment, the condition is dependent upon a result of the processing of actual geometry that is to be processed for the render output, i.e. geometry that, if visible, will in itself contribute to the render output (as against, e.g., the processing of any "test" geometry that will not actually be rendered to be present in the actual render output).

While it would be possible for the or a condition associated with a conditional task to be dependent upon the processing geometry for only a particular other task or tasks that are to be executed when generating the render output, in an embodiment, the or a condition that is associated with the conditional task that depends upon the result of processing geometry for the render output is dependent upon (and can be triggered by) the result of the processing of any geometry (real geometry) for the render output. In other words, in an embodiment, the or a condition associated with a conditional task can be triggered if any geometry for any of the other "real" (non-conditional) tasks that are to be executed when generating a render output in question meets the condition for the task (as against, e.g., only geometry for specific tasks of a given set of tasks to be executed when generating a render output being able to trigger the conditional task).

Thus, in an embodiment, the or a condition associated with a conditional task is triggered by a result of processing of geometry associated with a task other than the conditional task (and, in an embodiment, by geometry associated with any of the non-conditional tasks that are to be executed when generating the render output in question).

Correspondingly, in an embodiment, the or a condition for a conditional task is triggered by geometry for a different task to the conditional task (that is not associated with or related to the conditional task in question).

In an embodiment, a condition that can be associated with a conditional task is whether any geometry that is to be processed for a non-conditional task that is to be executed when generating the render output in question falls at least partially within (intersects) the area over which the condition for the conditional task is to be considered. Thus, for example, in an embodiment the condition associated with a conditional task is whether any geometry (e.g. primitives) intersects the tile that is currently being processed. This may be particularly useful for conditional tasks that act to load data values (and in particular depth values) that are required for subsequent non-conditional tasks.

In an embodiment a condition that can be associated with a conditional task comprises whether at least one fragment (sampling positions or sets of sampling positions) is issued by a rasteriser of the graphics processing pipeline when rasterising geometry for a non-conditional task to be executed to generate the render output and passes a, and in an embodiment all of the, early culling tests (such as an early depth test) that fragments issued by the rasteriser are to undergo in the graphics processing pipeline (if any), for the area that the condition for the task relates to. Thus, in an embodiment, the conditional task is associated with a condition that is met if a fragment for "non-conditional" task geometry passes an early culling test (and, in an embodiment, an early depth test) in the graphics processing pipeline for the tile being processed. Again, this may be particularly useful for conditional tasks that act to load data values (and in particular colour values) that are required for subsequent non-conditional tasks.

In an embodiment, it is also possible to set the condition for a conditional task such that the task will always be executed, irrespective of any property of the render output that is being processed. This can then be used where it is desired for the conditional task to be executed irrespective of any property of the render output. Such an "always" condition could be used, e.g., to implement blit-like operations where the only geometry required in a frame is, in effect, a primitive which covers the whole frame, without having to create a primitive list.

Correspondingly, in an embodiment, it is possible to associate with a conditional task a condition that will ensure that the conditional task is never executed, irrespective of any properties of the render output being generated. Such a "never" condition can be used to disable the conditional task in question. This may be useful where it is desired to prevent the conditional task from executing irrespective of any properties of the render output being generated.

In an embodiment, a condition that can be associated with a conditional task comprises whether any geometry processed for a task other than a (or the) conditional task results in an output data value for that other task being generated (and, in an embodiment, stored), for the area that the condition for the task relates to. For example, it could be determined whether the depth and/or colour buffer is updated by a task other than a (or the) conditional task for the area that the condition for the conditional task relates to, and if the colour or depth buffer is updated, then the conditional task is triggered (but not otherwise). In an embodiment, this is what is done. This may be particularly useful for conditional tasks that act to process data values that are generated by other tasks that are being performed when generating the rendering output.

In this case, the relevant output for the non-conditional task could be tracked to determine if an output is generated by the non-conditional task. For example, a dirty bits arrangement could be used to determine whether an output has been written for the non-conditional task to the appropriate buffer (e.g. the colour and/or depth buffer). In such arrangements, in an embodiment the, e.g. depth and colour, buffers are tracked separately, so that a conditional task can be triggered when either one or other or only if both, buffers are updated. Other arrangements for determining whether a non-conditional task has produced an output (e.g. updated a buffer of data values) could be used if desired.

In the case where the condition for a conditional task relates to whether or not a given set of data values (e.g. a depth or colour buffer) has been updated or not, then in an embodiment any conditional task that is executing is configured not to update any tracking arrangement (e.g. dirty bits) that is being used to track whether the set of data values has been updated or not. This will then avoid a conditional task triggering the conditional task that is dependent on whether the set of data values is updated or not.

It would also be possible, for example, to consider whether any output values from a non-conditional task for the area that a conditional task relates to are the same or not, and, e.g., only then trigger the conditional task if all the output values are not the same (or vice-versa). This may be useful where, for example, the conditional task is a task that operates to average or otherwise filter a set of output values generated by another task that is executed for the render output.

Other conditions for the conditional task could also instead be used if desired. For example, conditions could be associated with particular geometry (e.g. primitives) to be processed for tasks other than the conditional task in question, with the conditional task then being triggered if the particular, e.g. primitive condition, is met. It would also be possible to associate a conditional task with several conditions, such that the conditional task will only execute if all the selected conditions are met.

In an embodiment, the operation of the technology described herein is also combined with an arrangement that determines whether to write back the results of the rendering output which the conditional task relates to external memory (e.g. a frame buffer). In particular, in an embodiment if a conditional task to be executed when generating a render output is not in fact executed, then the write back mechanism to external memory for the rendering output that is being generated that the conditional task relates to is not performed (is disabled). This could then be used, for example, in an embodiment, in a tile-based graphics processing system to avoid writing back tiles to external memory where there is in fact no update to the tile data actually being generated (which may arise, for example, in the case of incremental rendering where the incremental rendering is being done on a previous tile whose output has already been generated). In this case, if the incremental rendering doesn't change the existing tile data, the Applicants have recognised that there is no need to write back the "new", unchanged tile to external memory.

This arrangement again, in an embodiment, tracks whether the rendering output being generated has updated an output data array, such as a colour or depth buffer, and only triggers the writing back of the output data array to external memory if it has been updated.

Again, in an embodiment, any conditional task that is being processed in this regard can be and is in an embodiment configured such that it will not update the data array, e.g., colour and/or depth buffer, update tracking mechanism (e.g., and in an embodiment, such that it won't update the colour and tile buffer "dirty bits"), so that any conditional tasks will not trigger the writing back of the data to external memory on their own.

In these arrangements (and otherwise), whether or not a conditional task updates the particular update tracking mechanism (e.g. dirty bits) can, in an embodiment, be selectively enabled or disabled (in an embodiment on a task by task basis), e.g. by the driver for the graphics processing pipeline.

Correspondingly, in an embodiment, whether or not the rendering output will be written back to external memory (e.g. the frame buffer) only when updated data values are generated and stored can, in an embodiment, be selectively enabled or disabled (e.g. such that the data array will always be written back to external memory, or will only be written back to external memory if it is determined that it has been updated).

The graphics processing pipeline can determine whether the condition associated with a conditional task has been met, and then trigger the processing for the task when the condition associated with the task has been met, in any desired and suitable manner. This may, and in an embodiment does, for example, depend upon the nature of the condition that is associated with the task and the processing that is to be performed if the condition is met. Thus, for example, and in an embodiment, different conditions can have different trigger points in the graphics processing pipeline.

In the case where the condition associated with a task is such that the conditional task will always be executed, or will never be executed, then the graphics processing pipeline can simply determine whether to execute the task or not once it sees that condition. For other conditions, where a property or properties of the graphics processing output (for example) for the, e.g. area of the graphics processing output being considered, must be considered, then the graphics processing pipeline, in an embodiment, operates to monitor a property or properties associated with the respective condition, and then triggers the processing for the conditional task when it is determined that the condition is met.

In the case where the condition associated with a conditional task is whether any geometry that is to be processed for a non-conditional task that is to be executed when generating render output in question falls at least partially within (intersects) the area of the render output that the condition associated with the conditional task relates to, then in an embodiment, the graphics processing pipeline determines if the condition is met by determining if a primitive list (i.e. a list of primitives to be processed) for the area of the rendering output in question (e.g. that is being processed (e.g., and in an embodiment, the tile list for the current tile, in the case of a tile-based graphics processing pipeline)) contains any geometry for a non-conditional task (i.e. contains any "real" geometry for the render output in question). If the primitive (e.g. tile) list does contain any geometry for a non-conditional task, then the conditional task can be executed (but not otherwise).

Thus, in one embodiment, the graphics processing pipeline determines whether a conditional task has been met by waiting until a primitive list (e.g. for a tile), is read, and if when the primitive list is read it contains any geometry that is not associated with a conditional task, then the conditional task is executed.

In the case where the condition associated with a conditional task comprises whether at least one fragment is issued by a rasteriser of the graphics processing pipeline and passes a (and in an embodiment each) early culling test, then in an embodiment, the graphics processing pipeline monitors the fragments that are exiting the early culling test (e.g. that are reaching the rendering (shading) stage of the graphics processing pipeline), and if a fragment that relates to geometry that is associated with a non-conditional task passes a (or all) the early culling tests for the area that the condition for the conditional task relates to, then the condition for the task is determined to be met and the processing for the conditional task is executed.

Where the condition for the conditional task relates to whether or not an output from other geometry (and tasks) that is to be processed for the render output in question has been generated (e.g. the colour and/or depth buffer or buffers have been updated), then again the graphics processing pipeline, in an embodiment, tracks whether output data is being generated (e.g. using a dirty bits arrangement to track whether the tile buffers have been updated), and once it is determined that an output has been generated (e.g. the colour or depth buffer has been updated), then the processing for the conditional task is triggered.

If the condition for a conditional task is not met, then the processing for the conditional task should not be, and in an embodiment is not, executed (at least completely). In this case, the graphics processing pipeline could, e.g., wait until all the other tasks for the render output (or for the particular region of the render output, e.g. tile) in question have been completed before finally determining that the condition for the conditional task has not been met, or, e.g., it could be determined at an earlier stage that the condition for the task has not been met, e.g. when all of the primitive lists have been read. In an embodiment, the arrangement is such that the conditional task is triggered when its condition is met, but there is no "positive" determination that the condition is not met (rather the graphics processing pipeline only operates to monitor and determine if the condition is met).

When it is determined that the condition for a conditional task has been met, then the processing for the conditional task should be and is, in an embodiment, executed over the region of the render output associated with the task. This processing can be performed and implemented in any suitable and desired manner, e.g., and in an embodiment, depending upon the nature of the condition associated with the task and the processing that the conditional task is to perform.

This may, and in an embodiment does, also depend upon whether the processing for the conditional task is to be executed before or after the geometry for other, e.g. non-conditional tasks.

The processing for the conditional task if the condition for the task is met should be such that the "geometry" (e.g. fragments) associated with the conditional task is processed as if it were "real" geometry that is to be rendered when generating the rendering output. (On the other hand, if the condition for a conditional task is not met, such that the processing of the conditional task is not triggered, then the arrangement is in an embodiment such that in that case, the graphics processing pipeline and renderer operates to generate its render output as if the "geometry" (e.g. fragments) that is associated with the conditional task did not exist.)

In the case where the conditional task is to be processed before other geometry associated with a non-conditional task, then, in an embodiment, the operation is such that the condition task will be processed by the graphics processing pipeline such that its processing will be completed before any other geometry (e.g. associated with a non-conditional task) that is to be processed by the graphics processing pipeline that needs the result of the processing of the conditional task reaches the stage of needing the result of the processing of the conditional task. In an embodiment the triggering and processing of the conditional task results in "geometry" (e.g., and in an embodiment, fragments and/or a primitive or primitives) for the conditional task being inserted into and processed by the graphics processing pipeline such that its processing will be completed before any other geometry (e.g., fragments and/or a primitive or primitives, e.g. associated with non-conditional tasks) that is to be processed by the graphics processing pipeline that needs the result of the processing of the conditional task reaches the stage of needing the result of the processing of the conditional task.

This would be the case, for example, where the conditional task is operable to load previously generated data into the graphics processing pipeline for subsequent processing, e.g. in an incremental rendering operation.

To achieve this, in the case where, for example, the condition associated with the task is whether any geometry associated with other (non-conditional) tasks to be executed for the render output falls within a particular area of the render output, the task could be triggered by determining, e.g., if the primitive list is read and contains any geometry, with "geometry" (e.g. fragments and/or a primitive or primitives) for the conditional task then immediately being issued to the graphics processing pipeline for processing (and in an embodiment, that is what is done).

It will be appreciated that in these arrangements, the condition associated with the conditional task is effectively being triggered by geometry for other tasks that actually will be processed (rendered) later than the geometry (e.g. fragments and/or a primitive or primitives) for the conditional task. In other words, the conditional task is effectively operable to trigger the processing of geometry (e.g. fragments and/or a primitive or primitives) in advance of the processing of the geometry that triggers the conditional task. Thus, in an embodiment, the or a condition associated with a conditional task is dependent upon a result of processing geometry (e.g. primitives) that is to (will) be processed after the geometry (e.g. fragments and/or a primitive or primitives) associated with the conditional task (if the conditional task is triggered) (rather than being dependent upon a result of processing of geometry (primitives) that are to be (that will be) processed before the geometry (e.g., fragments and/or a primitive or primitives) for the conditional task). Similarly, in an embodiment, the or a conditional task is operable to trigger the processing of geometry (e.g. fragments and/or a primitive or primitives) for the conditional task (if the task's condition is met) in advance of (further) processing of geometry (e.g., and in an embodiment, fragments and/or a primitive or primitives) for the task that triggered the conditional task.

In the case of a conditional task that is to be performed after the processing of other geometry (e.g. relating to non-conditional tasks) for the render output being generated, then again the geometry (e.g. fragments and/or a primitive or primitives) for the conditional task should be issued to the pipeline at an appropriate timing relationship to the other geometry (e.g., fragments and/or a primitive or primitives) that is being processed for the render output. For example, in this case, the geometry (e.g. fragments and/or a primitive or primitives) associated with the conditional task could be, and in an embodiment is, issued directly after (and only after) the other geometry (e.g., fragments and/or a primitive or primitives) that is to be processed has been issued to the graphics processing pipeline for processing.

Other arrangements would, of course, be possible.

The geometry (e.g. fragments and/or a primitive or primitives) for the conditional task can be issued to the graphics processing pipeline for processing in any desired and suitable manner. It is, in an embodiment, issued to the graphics processing pipeline in the normal manner for geometry (e.g., fragments and/or a primitive or primitives) that is to be processed, for example, and in an embodiment, by injecting the geometry (e.g. fragments and/or a primitive or primitives) into the pipeline in the normal manner for the graphics processing pipeline in question.

In this case, all the fragments for the conditional task could be issued to the graphics processing pipeline at once, or, for example, they could be issued one (or only a few) at a time, e.g. depending upon whether a fragment for the conditional task has already been issued for the position in the render output in question (e.g. that is being currently processed). The latter arrangement could be facilitated, e.g., by tracking for each fragment position in the render output (e.g. tile) being processed whether a conditional task fragment has been issued for that position or not (e.g. using a bit vector or map for each, e.g., fragment position).

It would also be possible to issue geometry (e.g. fragments and/or a primitive or primitives) for a conditional task to the graphics processing pipeline and for that geometry to be partially processed by the graphics processing pipeline irrespective of whether the condition associated with the task is met or not (but with the complete processing of the geometry (e.g. fragments and/or a primitive or primitives) associated with the conditional task only being performed if and when it is determined that the condition for the task has been met). This may be appropriate where, for example, the condition associated with the task can only be determined to be met at a later stage in the graphics processing pipeline, for example, where a fragment associated with geometry relating to a non-conditional task passes an early culling test, but the geometry (e.g. fragments and/or a primitive or primitives) associated with the conditional task needs to be processed before that other geometry (if the task's condition is met).

Thus, in an embodiment, geometry (e.g. fragments and/or a primitive or primitives) associated with a conditional task can be, and is, partially processed before it is determined whether the condition for the task has been met, but the remaining processing for the geometry associated with the conditional task is only performed if and when it is determined that the condition for the task has been met (thus the complete processing of the geometry associated with the conditional task is only performed if the condition associated with the task is determined to be met).

Thus, in an embodiment, a primitive or primitives for a conditional task is rasterised to fragments, but then those fragments are only issued to the rest of the graphics processing pipeline (e.g., and in an embodiment, to the rendering (shading) stages of the graphics processing pipeline) if the condition associated with the task is determined to be met. This may be particularly useful where, for example, the condition associated with a task is whether any fragments associated with another task pass an (or all) early culling test of the graphics processing pipeline.

In an embodiment of these arrangements, the fragments that are issued before it is determined whether the condition for the task has been met or not are held in a queue associated with the graphics processing pipeline until such time as it is determined that the condition associated with the task has been met. These fragments can then be issued from the queue to the graphics processing pipeline when it is determined (and, in an embodiment, as soon as it is determined) that the condition for the task has been met. In this case, the fragments for the conditional task could be and in an embodiment are, marked as such, e.g. marked as being "conditional", so that they can be identified in the queue. For example, each such fragment could be associated with a flag or other marker that indicates that it is "conditional".

In this arrangement, the conditional fragments for a, e.g. given tile, will be released from the queue when it is determined that the condition has been met, but if the condition is not met for the render output being generated, then the conditional fragments relating to the conditional task are, in an embodiment, removed from the queue (e.g. marked as invalid). In an embodiment, if the condition is not met for the render output being generated, then all the conditional fragments relating to the conditional task are, in an embodiment, removed from the queue at the same time (in one go).

These arrangements can be implemented in any desired and suitable manner.

In an embodiment, the processing of fragments (in an embodiment for both conditional and non-conditional tasks) is controlled using the mechanism described in the Applicant's earlier US Patent Application US 2014/168220 A1.

Thus, in an embodiment, when a fragment for a task passes an (or the) early depth (and/or other culling) test and is sent onwards through the pipeline for processing, information (and, in an embodiment, position information) relating to the fragment that has passed the early, e.g. depth, test is broadcast to at least one, in an embodiment later, stage of the graphics processing pipeline, and the broadcast information associated with the fragment that passed the early, e.g. depth, test is used to determine if any fragments that are currently at a stage that received the broadcast information will be overdrawn by the fragment that passed the early, e.g.

depth, test, and if any such fragments exist, future processing of those overdrawn fragments is (in an embodiment selectively) stopped.

Conditional tasks in the manner of the technology described herein can be used for any suitable and desired graphics processing operations and rendering output that is to be generated.

However, as will be appreciated from the above, it is envisaged that a particular application of the conditional tasks in the manner of the technology described herein will be for use when performing incremental rendering. In this case, when incremental rendering is to be performed (e.g. the driver for the graphics processing pipeline recognises that an incremental rendering operation is to be performed), then, in an embodiment, two conditional tasks with different conditions are issued to the graphics processing pipeline, one conditional task operable to load previously generated depth values for the frame that is being incrementally rendered, and one to load the previously generated colour values for the frame that is being incrementally rendered. In this case, each of these conditional tasks would be configured such that "geometry" (e.g. fragments and/or a primitive or primitives) for the conditional task will be processed before "real" geometry for the rendering output (i.e. before the geometry that is to perform the actual incremental rendering operation is processed) needs the result of the conditional task.

In this case, there will, in an embodiment, be a first conditional task that has as its condition whether any geometry for the non-conditional tasks for the render output being generated (i.e. "any real" geometry that is being used to incrementally render a previous frame) intersects the area that the conditional task relates to, and which is operable to load the depth buffer data if that condition is met. This will then have the effect that the depth buffer values for the frame that is being incrementally rendered will only be loaded if there is actual incremental rendering geometry to be processed, e.g. for the tile in question.

The second conditional task, in an embodiment, then has the same condition that its geometry will only be processed if the real geometry for the incremental rendering operation intersects the area (e.g. tile) of the render output in question, but also has a further condition that it is only triggered if any of that real geometry passes the early culling tests (and, in an embodiment, the early depth test), and is, in an embodiment, operable to load the colour values for the frame that is being incrementally rendered if its conditions are met. This will then have the effect that the colour values for the frame that is being incrementally rendered are only loaded into the graphics processing pipeline for the incremental rendering operation if and when geometry that relates to the incremental rendering operation falls to be processed for the render output area (e.g. tile) in question.

It would also be possible to include as well (or instead) a conditional task that is to be executed after the "real" (non-conditional) geometry for the rendering output has been processed, with the condition that the conditional task is executed if the real geometry results in any actual output values (e.g. updates an output data array, such as a tile buffer for the tile in question). This could be used, for example, to perform post-processing operations, such as downsampling, filtering, or other processing on a generated render output. It could be used, for example, to perform multisampled rendering to a particular frame format, to run a shader (a shading program) on a rendered tile (a tile shader), etc.

It would also be possible to use only conditional tasks for generating a render output. This may be appropriate where, for example, only "simple" composition is required, such as displaying video with captions. For example, one or more conditional tasks could be used to load in appropriate data values to be processed, and then a post-processing conditional task used to, e.g., blend the loaded data in the desired manner.

In this case, the condition for the tasks that are to read in the data could, for example, be set such that the tasks are "always" to be executed, i.e. will be executed irrespective of any property of the render output being generated. This could then be used, e.g., to load an, e.g. rectangular, region of interest, such as the whole frame (which may be useful for simple composition cases).

Once all the conditional and any non-conditional tasks have been completed, the resulting render output (e.g. frame for display) can, e.g., be written, e.g. to a frame buffer, in main memory, from where it can then, e.g., be provided to a display for display, or otherwise processed, as desired.

In an embodiment, a conditional task can also have associated with it an area in which its processing is to be performed, for example in the form of a "scissor box".

In a tile-based graphics processing system, in an embodiment, any geometry (e.g. a primitive or primitives) that is associated with a conditional task is not subjected to the tiling process (rather, as discussed above, that geometry will, in an embodiment, be automatically issued for a tile, if the tile meets the conditions necessary for the conditional task to be triggered). Thus, in an embodiment, only the "true" geometry for the render output (i.e. that is associated with non-conditional tasks) is "tiled" (sorted into the tile lists).

Where, as would be the case in a tile-based graphics processing system, a given render output is processed as a plurality of sub-areas or regions of the overall render output, then the operation in the manner of the technology described herein should be and is, in an embodiment, repeated for each respective sub-area (e.g. tile) that is processed when generating the overall render output. Thus, in this case there will, for example, be a conditional task set for generating the render output, and that task will then be respectively executed (i.e. have its condition tested and its processing executed if the condition is met) for each sub-area (e.g. tile) that the render output being generated has been divided into for processing purposes.

The technology described herein can be implemented in any desired and suitable graphics processing system and pipeline. In an embodiment the graphics processing pipeline is a tile-based graphics processing pipeline.

The above describes the elements of the graphics processing pipeline that are involved in the operation in the manner of the technology described herein. As will be appreciated by those skilled in the art, the graphics processing pipeline can otherwise include, and in an embodiment does include, any one or one or more, and in an embodiment all, of the other processing stages that graphics processing pipelines normally include. Thus, for example, the graphics processing pipeline in an embodiment includes at least a rasteriser operable to rasterise graphics primitives to generate graphics fragments to be processed, and a renderer operable to process fragments generated by the rasteriser to generate rendered fragment data. In an embodiment the renderer is in the form of or includes a programmable fragment shader.

The graphics processing pipeline in an embodiment also includes one or more of, and in an embodiment all of: a vertex shading stage; a primitive assembly stage; a tiler (tiling stage); a primitive setup stage; a tile buffer or buffers for storing tile sample values (where the pipeline is tile-based) and/or a write out unit that operates to write data (e.g. in the tile buffer (e.g. once the data in the tile buffer is complete)) out to external (main) memory (e.g. to a frame buffer).

The graphics processing pipeline may also contain any other suitable and desired processing stages that a graphics processing pipeline may contain such as a depth (or depth and stencil) tester or testers, a blender, etc.

In an embodiment, the graphics processing pipeline comprises, and/or is in communication with, one or more memories and/or memory devices that store the data described herein, and/or that store software for performing the processes described herein. The graphics processing pipeline may also be in communication with a host microprocessor, and/or with a display for displaying images based on the output of the graphics processing pipeline.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can include, as appropriate, any one or more or all of the embodiments described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising a code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows an exemplary computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to cause the graphics processor 3 to execute tasks to generate graphics output required by the application 2. To facilitate this, a set of "commands" will be provided to the graphics processor 3 in response to commands from the application 2 running on the host system 1 for graphics output (e.g. to generate a frame to be displayed).

In the present embodiments the "commands" to the graphics processor 3 to generate an output (e.g. to render frames for display) instruct the graphics processing pipeline 3 to execute particular tasks to generate the render output and are provided to the graphics processing pipeline 3 in the form of draw call descriptors that are generated in response to commands from the application 2 running on the host system 1 for graphics processing. In practice there may be plural draw calls (tasks) to be executed, each having a corresponding draw call descriptor. Other arrangements would, of course, be possible.

Figure 2:
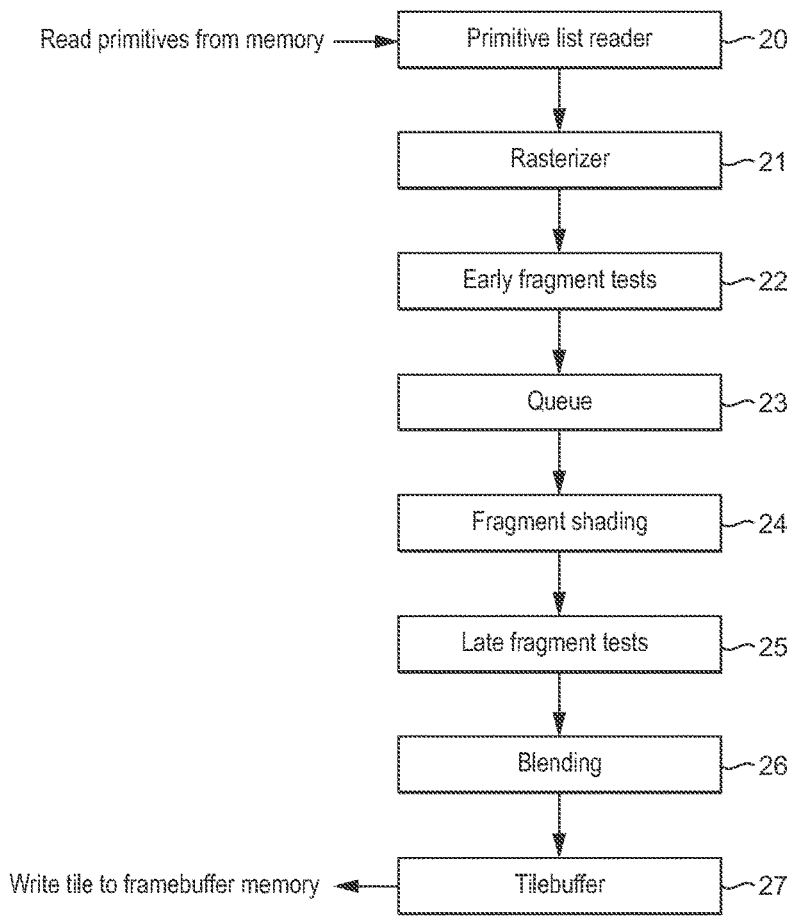
FIG. 2 shows schematically an embodiment of a graphics processing pipeline.

FIG. 2 shows the graphics processing pipeline 3 of the present embodiment in more detail.

The graphics processing pipeline 3 shown in FIG. 2 is a tile-based renderer and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

(As is known in the art, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

FIG. 2 shows schematically the pipeline stages after the graphics primitives (polygons) for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processing pipeline 3.

As shown in FIG. 2, this part of the fragment processing pipeline of the graphics processing pipeline 3 includes a number of processing stages, including a primitive list reader 20, a rasterisation stage 21, an early fragment ZS (depth and stencil) test stage 22, a fragment queue 23, a rendering stage in the form of a fragment shading stage 24, a late ZS (depth and stencil) test stage 25, a blending stage 26 and a set of tile buffers 27.

The primitive list reader 20 operates to read the primitives from the list of primitives that is to be processed for the tile in question, and then to provide those primitives to the rasteriser 21. (In a tile-based graphics processing system, the primitives to be processed for a given render output are first sorted into respective primitive lists for each tile of the render output to be processed, with each such primitive list listing those primitives for the render output that need to be processed for the tile in question. The primitive list reader then reads the primitives from the respective tile lists, as each tile falls to be processed.)

The rasterisation stage 21 operates, as is known in the art, to rasterise the primitives making up the render output (e.g. the image to be displayed) into individual graphics fragments for processing. To do this, the rasteriser 21 receives graphics primitives for rendering from the primitive list reader 20, rasterises the primitives to sampling points and generates graphics fragments having appropriate positions (representing appropriate sampling positions) for rendering the primitives. (Thus the "fragments" are the graphical entities that pass through the rendering process (the rendering pipeline).) Each fragment that is generated and processed may, e.g., represent a single sampling point or a set of plural sampling points, depending upon how the graphics processing system is configured.

In the present embodiment, each graphic fragment that is generated by the rasteriser 21 represents (has associated with it) plural (and normally 4) sampling positions. (Other arrangements would, of course, be possible).

The fragments generated by the rasteriser are then sent onwards to the rest of the pipeline for processing.

The early Z/stencil (fragment test) stage 22 performs a Z (depth) test on fragments it receives from the rasteriser 21, to see if any fragments can be discarded (culled) at this stage. To do this, it compares the depth values of (associated with) fragments issuing from the rasteriser 21 with the depth values of fragments that have already been rendered (these depth values are stored in a depth (Z) buffer that is part of the tile buffer 27) to determine whether the new fragments will be occluded by fragments that have already been rendered (or not). At the same time, an early stencil test is carried out.

Fragments that pass the early depth and stencil test stage 22 (i.e. fragments having at least one associated sampling position that passes the early depth and stencil test stage 22) are then sent onwards to the fragment shading stage 24 (the renderer) via the fragment queue 23, as shown in FIG. 2.

(Fragments that fail the early depth and stencil test stage 22 are culled by the early depth and stencil test stage 22.)

The fragment queue 23 operates to hold fragments that pass the early fragment tests 22 before they are issued to the fragment shading stage 24. The queue 23 is configured to be able to hold one full tile-size set of fragments, although other arrangements would, of course, be possible.

Fragments can be selectively issued from the queue 23 in order to facilitate the operation of the present embodiments. In some embodiments fragments can also be "killed" in (removed from) the queue 23 to avoid their further processing. These arrangements will be discussed in more detail below.

The fragment shading stage 24 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 24 is in the form of a shader pipeline (a programmable fragment shader).

There is then a "late" fragment Z and stencil test stage 25, which carries out, inter alia, an end of pipeline depth test on the shaded fragments to determine whether a rendered fragment will actually be seen in the output. This depth test uses the Z-buffer value for the fragment's position stored in the Z-buffer in the tile buffer 27 to determine whether the fragment data for the new fragments should replace the fragment data of the fragments that have already been rendered, by comparing the depth values of (associated with) fragments issuing from the fragment shading stage 24 with the depth values of fragments that have already been rendered (as stored in the depth buffer). This late fragment depth and stencil test stage 25 also carries out any necessary "late" alpha and/or stencil tests on the fragments.

The fragments that pass the late fragment test stage 25 are then subjected to, if required, any necessary blending operations with fragments already stored in the tile buffer 27 in the blender 26. Any other remaining operations necessary on the fragments, such as dither, etc. (not shown) are also carried out at this stage.

Finally, the (blended) output fragment data (values) are written to the tile buffer 27 from where they can, for example, be output to a frame buffer for a display. The depth value for an output fragment is also written appropriately to a Z-buffer within the tile buffer 27. (The tile buffer will store, as is known in the art, colour and depth buffers that store an appropriate colour, etc., or Z-value, respectively, for each sampling point that the buffers represent (in essence for each sampling point of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer 27 is provided as part of RAM that is located on (local to) the graphics processing pipeline (chip).

The data from the tile buffer 27 may be input to a downsampling (multisample resolve) write out unit, and thence output (written back) to an external memory output buffer, such as a frame buffer of a display device (not shown). (The display device could comprise, e.g., a display comprising an array of pixels, such as a computer monitor or a printer.)

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system and pipeline shown in FIGS. 1 and 2. Further features of the operation of the graphics processing system and pipeline shown in FIGS. 1 and 2 in accordance with embodiments of the technology described herein will now be described.

Figure 3:
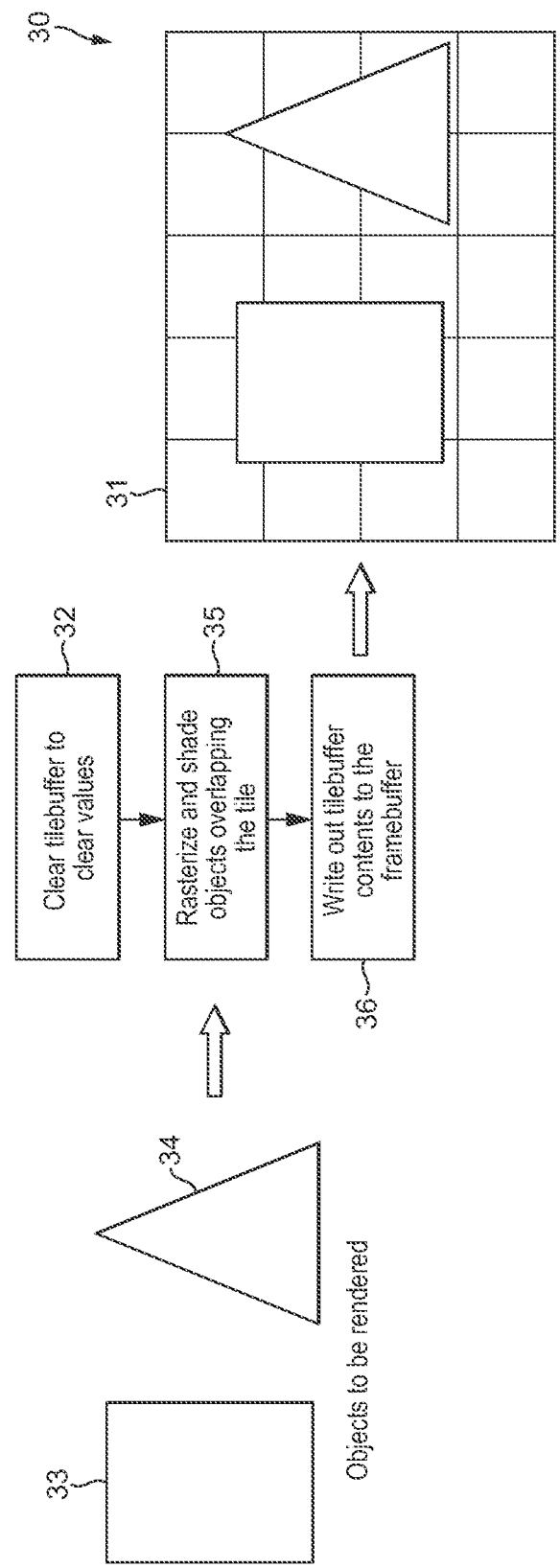
FIGS. 3 and 4 show schematically an incremental rendering operation.
Figure 4:
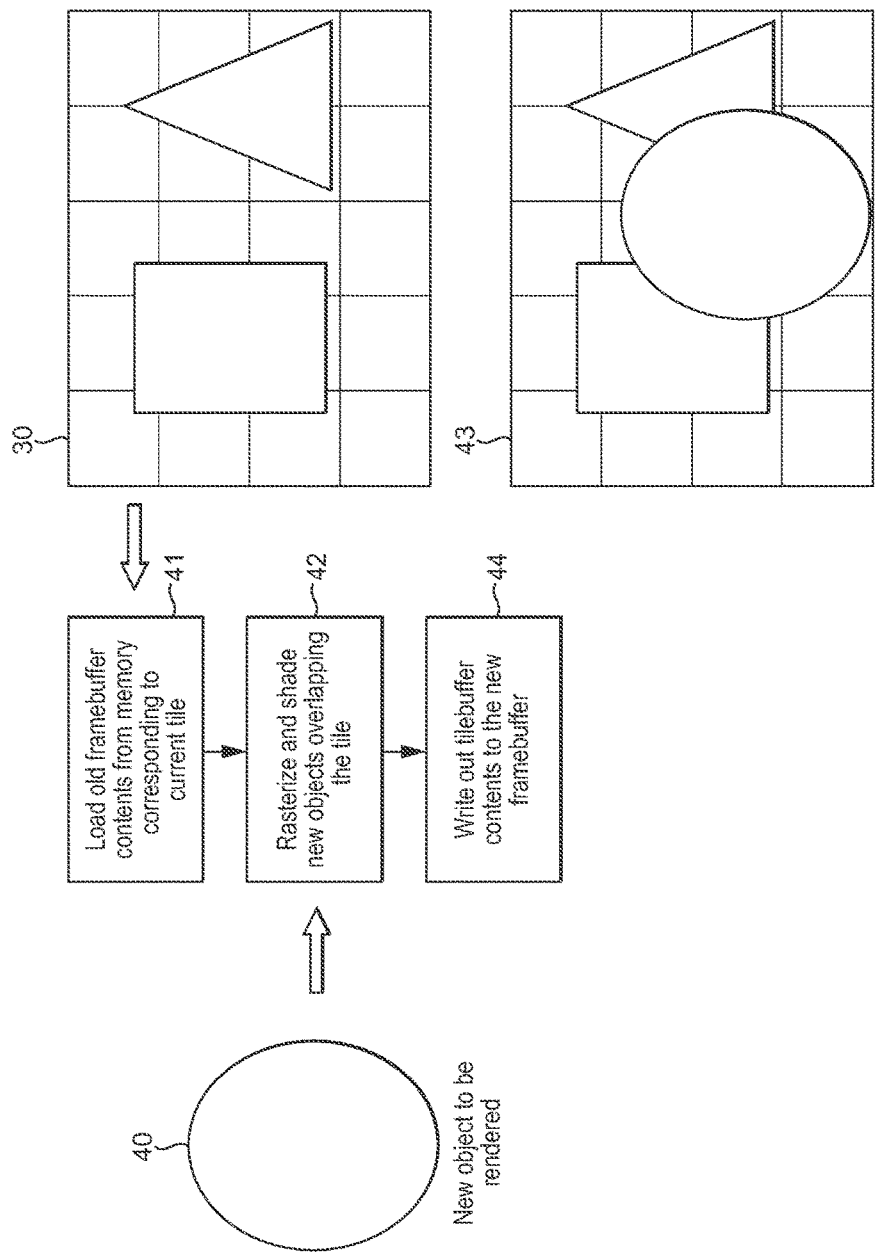

FIGS. 3 and 4 show an exemplary rendering operation that can be implemented using the techniques of the present embodiments. The exemplary rendering operation shown in FIGS. 3 and 4 is an incremental rendering operation.

As shown in FIGS. 3 and 4, to perform an incremental rendering operation, firstly a background image is generated as a render output (this is shown in FIG. 3), and then a new object to be rendered is rendered "on top of" that background image (this is shown in FIG. 4).

To render the background image 30, as shown in FIG. 3, the graphics processing pipeline, for each tile 31 of the background image 30, firstly, clears the tile buffer to clear values (step 32). Any parts of the objects 33, 34 to be rendered that overlap the tile being processed are then rasterised and shaded (step 35). Once the tile has been completed, its contents are written out to the frame buffer (step 36). This is repeated for each tile in turn, until the entire render output (the background image 30) has been generated.

Then, when a new object is to be incrementally rendered on top of the background image 30, the graphics processing pipeline is configured to perform the following processing for each tile, as shown in FIG. 4.

Firstly, the old frame buffer content for the previous (background) image 30 for the tile in question is loaded into the tile buffer for the tile being processed (step 41). Then, the new object 40 to be rendered is rasterised and shaded for the tile (if it at all falls within the tile being processed) (step 42). The resulting tile is then written out to the new frame buffer 43 (step 44) to provide the incrementally rendered render output.

It can be seen from FIG. 4, that in the incremental rendering operation, it is necessary for the tile buffer values for the background image 30 to be loaded into the graphics processing pipeline for the tile being processed, before the new object 40 is rendered for the incremental rendering operation. This could be done simply by automatically loading the entire previous frame tile buffer contents each time a tile falls to be processed. However, the Applicants have recognised that that can be inefficient, and so in the present embodiments, this operation is modified.

In particular, in the present embodiments, the operation of loading the background image tile contents when a tile falls to be processed for the incremental rendering operation is only performed if certain conditions for the tile being processed are met. This helps to reduce or avoid unnecessarily loading of the background image data when that will in fact not be required for the incremental rendering operation.

To do this, the driver 4 is configured to be able to instruct the graphics processing pipeline 3 to execute one or more "conditional" tasks when generating a render output. Each such task has a condition associated with it, and the graphics processing pipeline only performs some or all of the processing for the task when it determines that the condition for the task is met. The task also has an associated region of the render output to be processed for the task, and indicates the processing that the region should be subjected to (if the condition for the task is met). The conditional tasks can be (and typically will be) included with one or more other non-conditional tasks (draw calls) to be processed by the graphics processing pipeline 3.

In the present embodiments, the conditional tasks are indicated to the graphics processing pipeline 3 by including appropriate draw call descriptors in the set of draw call descriptors that are provided to the graphics processing pipeline 3 by the driver 4 when it is to generate a render output. Each conditional task draw call descriptor has a field in it that can indicate the condition for the task.

In the present embodiment, four different conditions can be indicated: that the pipeline should "never" perform the task; that the pipeline should "always" perform the task; that the pipeline should only perform the task if a "real" primitive to be processed for the render output (i.e. a primitive that relates to a non-conditional task (draw call)) intersects the tile in question; and that the pipeline should only execute the task if a fragment for a "real" primitive passes the early fragment tests of the pipeline. Other conditions would, of course, be possible, if desired.

In the present embodiments, the conditional tasks have the render output region that is to be processed for them indicated implicitly as being a full tile primitive (i.e. a primitive that covers the entire tile being rendered), and indicate the processing that that region (primitive) is to be subjected to if the condition for the task is met. The conditional tasks can also indicate whether their geometry (primitive) should be processed (if the task's condition is met) before or after geometry for any other (e.g. non-conditional) tasks (e.g. draw calls). Other arrangements would, of course, be possible, if desired.

In the present embodiments, the conditional tasks are in the form of "shaders" (i.e. shading programs) that are to be executed by the graphics processing pipeline (and for which at least some of the shading operation will only be performed if the condition for the task in question is met).

Other arrangements for the conditional tasks would, of course, be possible.

In order to control the graphics processing pipeline 3 to perform an incremental rendering operation in the present embodiments, when it recognises that an incremental rendering operation is to be performed the driver 4 includes in the set of draw calls to be executed by the graphics processing pipeline 3 when generating the incrementally rendered render output, two conditional tasks (shaders) in addition to the task (draw call) that renders the "real" geometry for the incrementally rendered output frame (in this example the primitives for the new object 40).

The two conditional tasks are configured such that their geometry (primitives) is to be processed before the "real" geometry for the render output (i.e. before the task (draw call) that renders the new object 40 incrementally over the background frame 30), with one of these "pre-frame shader" conditional tasks operating to load the depth buffer values from the previous frame that the incremental rendering is to be applied to if its condition is met, and the other conditional "pre-frame shader" operating to load the colour values for the previous frame that the object 40 is to be incrementally rendered onto if its condition is met.

The conditional task (pre-frame shader) that is to load the depth buffer values is set as the first conditional task to be performed, and has as its condition that geometry for the non-conditional task for the render output being generated (i.e. any "real" geometry for the object 40 that is being incrementally rendered onto the previous frame 30) must intersect (i.e. fall at least partially within) the tile being processed.

This conditional "pre-frame shader" is also configured such that, if its condition is met, a full-tile primitive will be issued to the rasteriser for rasterising, with the rendering process then operating to read the appropriate depth values for the previous (background) frame 30 and store those values into the appropriate depth buffer for the tile being processed for each fragment of the full tile primitive.

This will have the effect of loading the depth buffer values for the previous frame that is being incrementally rendered into the depth buffer for the tile being processed, but only if there is actual incremental rendering geometry (i.e. a primitive for the new object 40 in this example) to be processed for the tile in question.

The second conditional task that is to load the colour values then has the same condition that it will only be executed if the real geometry for the incremental rendering operation intersects the tile in question, but also has a further condition that it is only triggered if a fragment for that real geometry passes the early fragment tests 22.

This second conditional "pre-frame shader" is also configured such that, if its condition is met, fragments covering the full tile will be issued to the renderer for rendering, with the rendering process then operating to read the appropriate colour values for the previous (background) frame 30 and store those values into the appropriate colour buffer for the tile being processed for each fragment.

This will have the effect of loading the colour values for the previous frame that is being incrementally rendered into the colour buffer for the tile being processed, but only if and when a fragment that relates to the incremental rendering operation (i.e. for a primitive for the new object 40 in this example) falls to be rendered for the tile in question.

This allows for the fact that even if "real" geometry for the incremental rendering operation falls to be processed for a given tile, it can still be the case that none of that "real" geometry actually reaches the rendering stage (falls to be rendered for the tile) because, for example, it is culled in the early fragment tests 22. Having a second conditional pre-frame shader that only loads the colour values for the previous (background) frame if a fragment for "real" geometry passes the early fragment tests 22, helps to ensure that the colour values for the previous (background) frame are only loaded into the graphics processing pipeline when they will actually be needed.

The effect of these two conditional pre-frame shaders will then be that if there is no "real" geometry for the incremental rendering operation to be processed for a tile, then neither conditional pre-frame shader is executed (and so no processing will be done for the tile). However, if there is "real" geometry to be processed for the tile for the incremental rendering operation, then the first conditional pre-frame shader will operate first to load the depth values from the previous (background) frame that are needed for performing the early fragment tests for that "real" geometry, and then if fragments for the "real" geometry pass the early fragment tests, the second conditional pre-frame shader will operate to load the colour values from the previous (background) frame that are needed for rendering (shading) those "real" geometry fragments (and the "real" geometry fragments can then be rendered (shaded) in the normal manner using the loaded colour values).

The two conditional pre-frame shaders and the task (draw call) to render the actual, "real" incremental geometry (the new object 40 in this example) are configured by the driver to complete in the appropriate order (if the conditional tasks are triggered). Thus the first conditional task that is to load the depth buffer values is configured such that its processing (the loading of the depth values) (if it is triggered) will be completed before any fragments for the "real" geometry for the new object 40 undergo the early fragment tests. On the other hand, the processing of fragments for the second conditional task to load the colour values is configured to only take place after fragments for the new object 40 being rendered have been subjected to the early fragment test 22 (but such that the processing of the fragments for the second conditional task to load the colour values for the tile (if the second conditional task is triggered) will be completed before the fragments for the real geometry are rendered (to ensure that the colour values are loaded by the second conditional task before they are needed by the fragments for the real geometry)).

Figure 5:
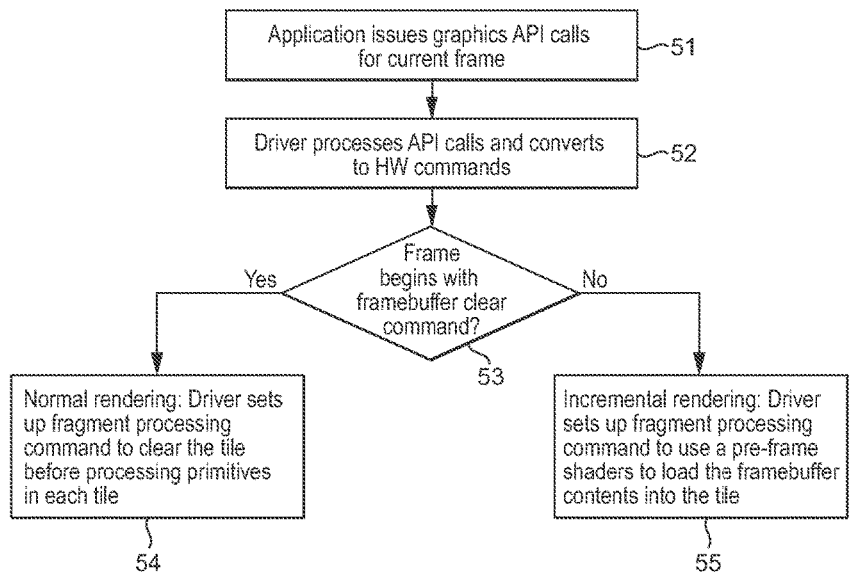
FIGS. 5-7 show the operation of a driver on a host processor in a graphics processing system when incremental rendering is to be performed in an embodiment of the technology described herein.
Figure 6:
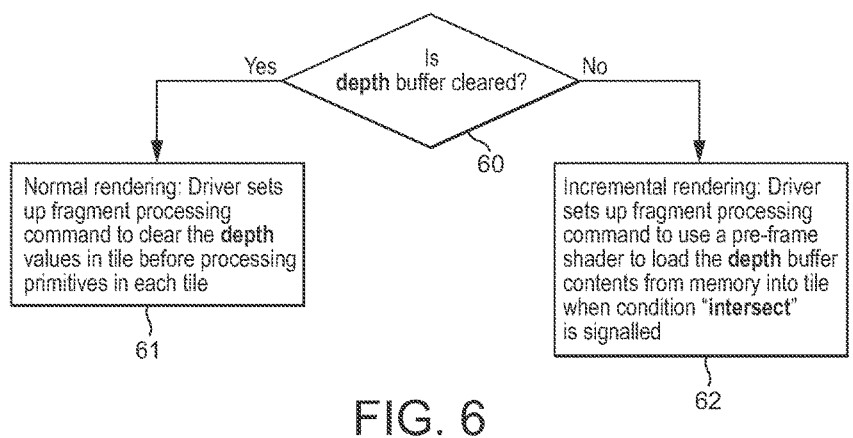
Figure 7:
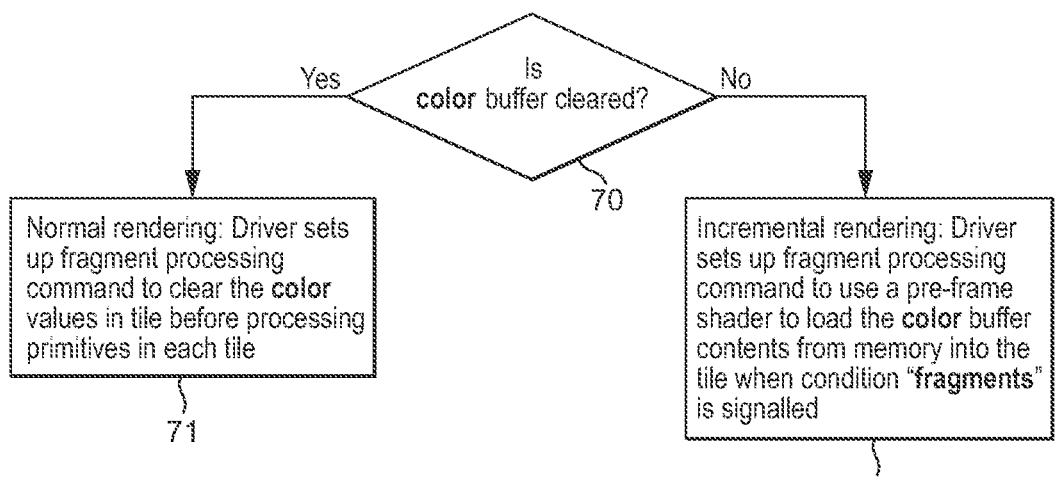
Figure 8:
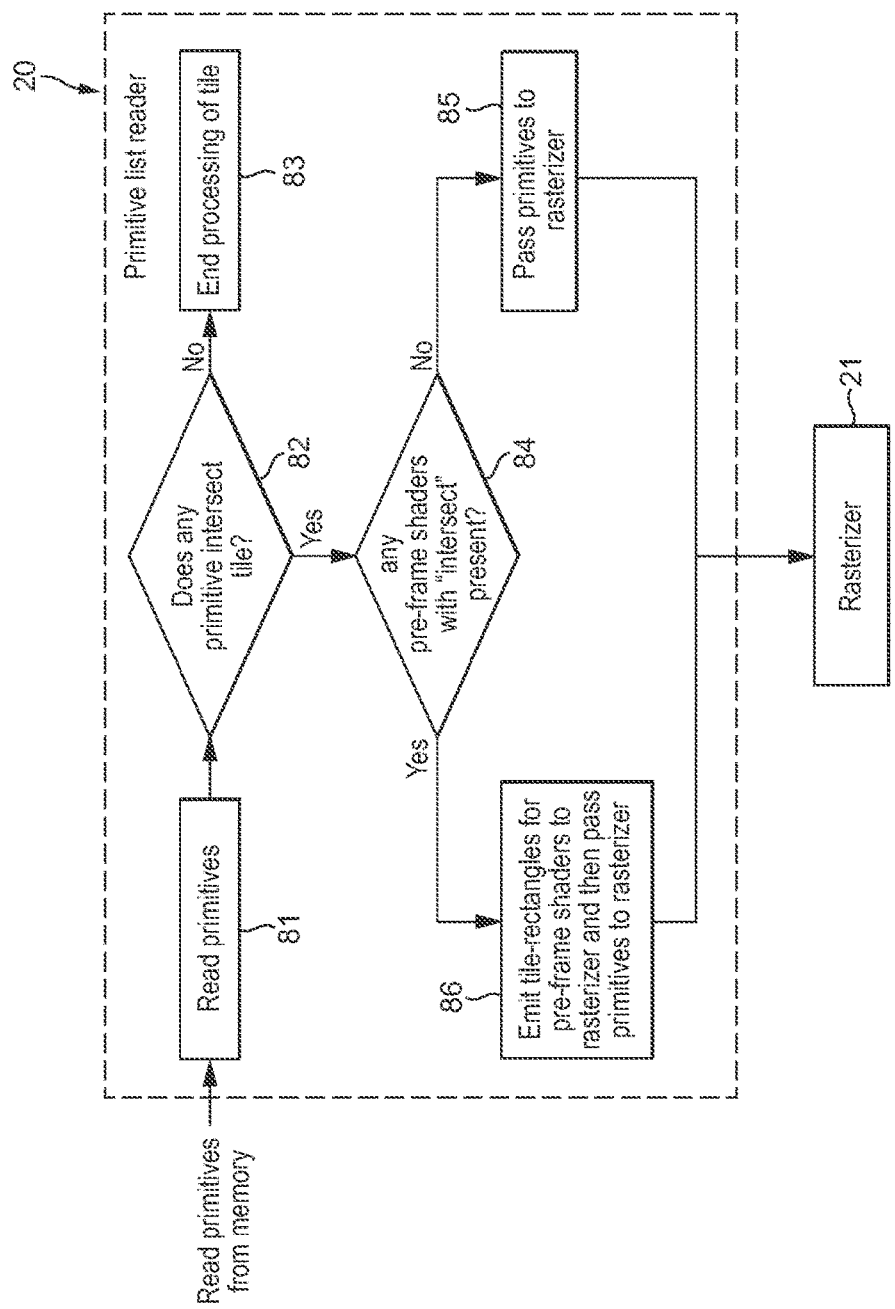
FIGS. 8-10 show the operation of the graphics processing pipeline of the graphics processing system when incremental rendering is being performed in an embodiment of the technology described herein.
Figure 9:
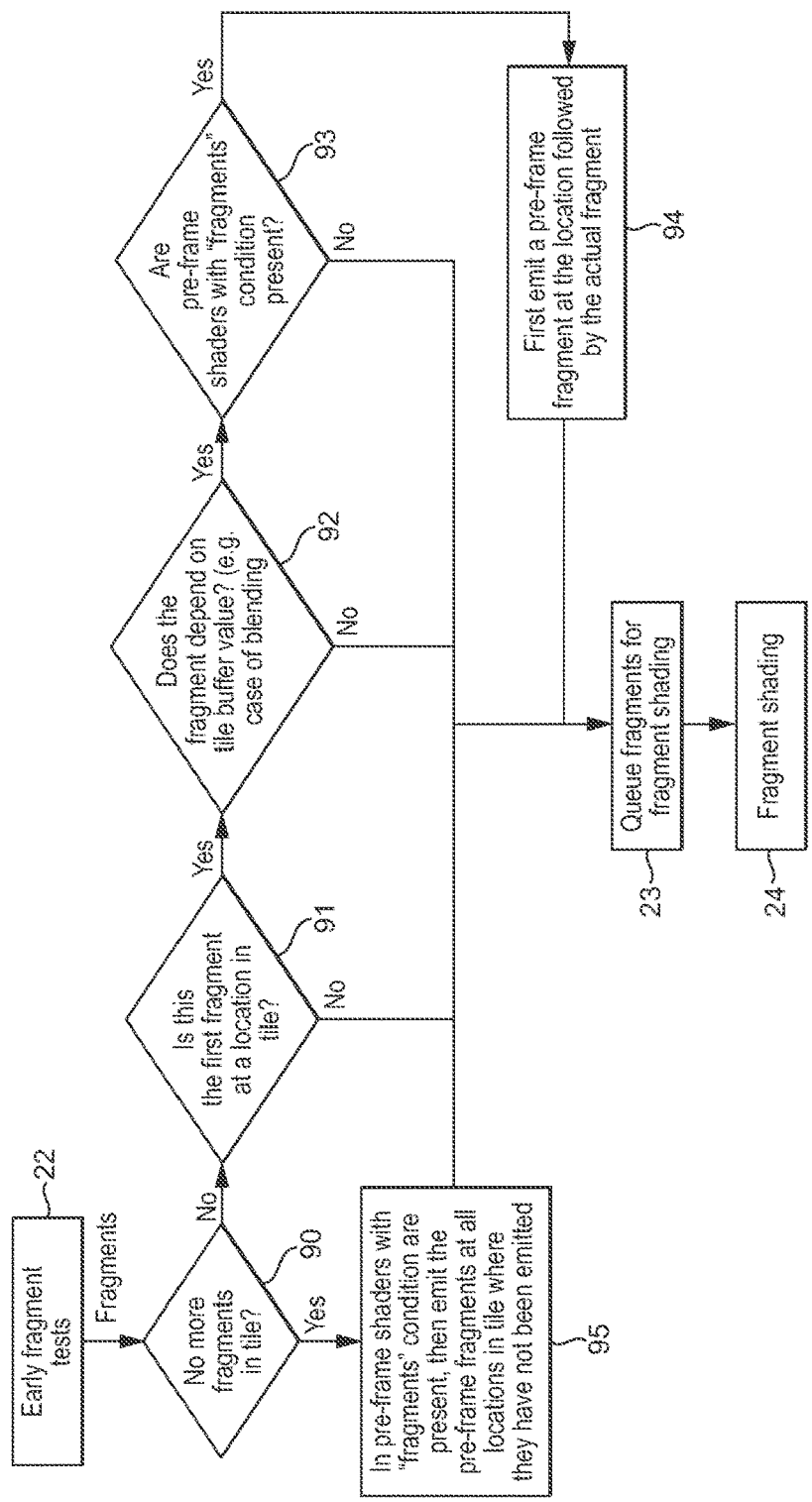
Figure 10:
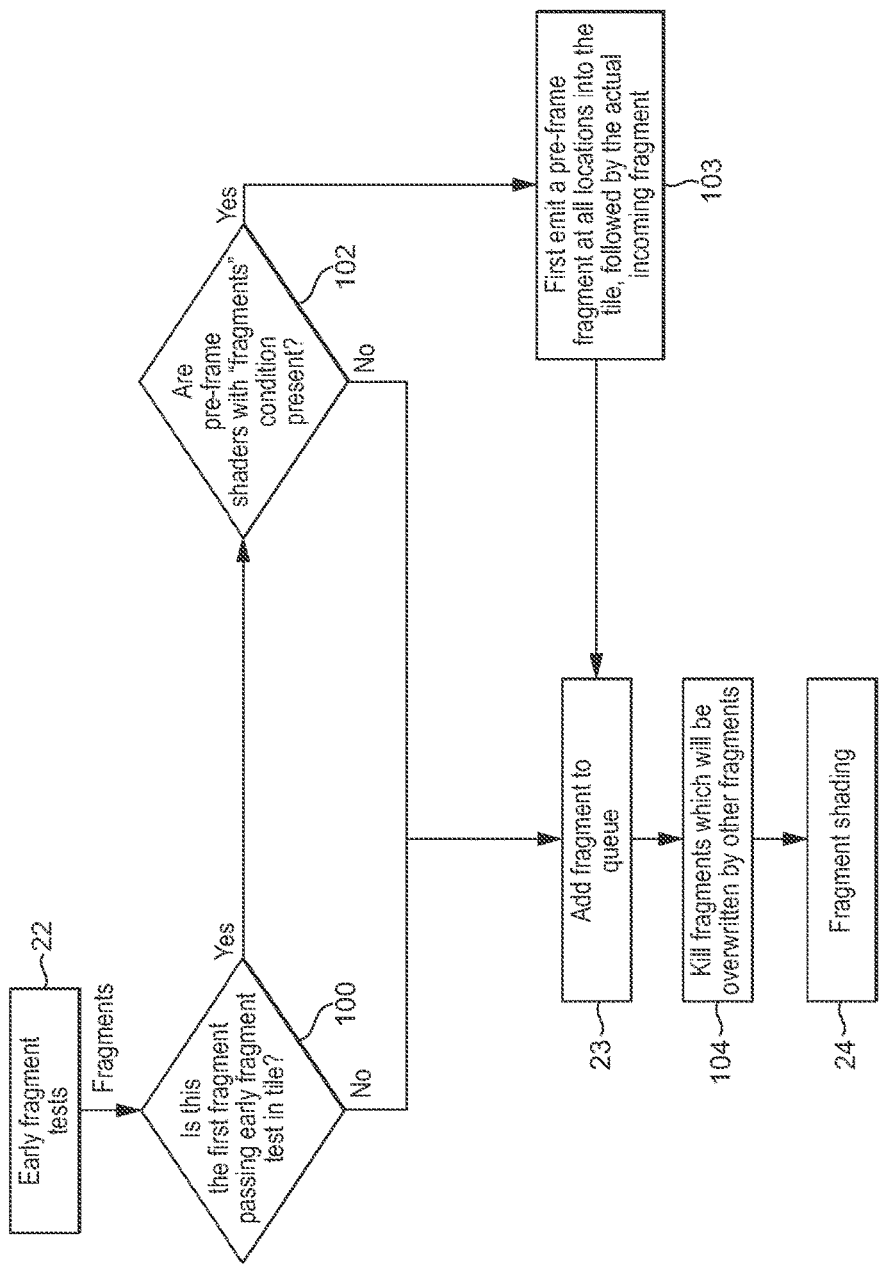

The above process will now be described in more detail with reference to FIGS. 5-10. FIGS. 5-7 illustrate the operation of the driver 4 on the host processor 1 in the present embodiments. FIGS. 8-10 show the operation of the graphics processing pipeline 3.

FIGS. 5-7 show schematically the operation of the driver in this arrangement. FIG. 5 shows the overall operation of the driver, and FIGS. 6 and 7 show in more detail the particular operation relating to the provision of the conditional tasks to the graphics processing pipeline.

The process starts with the driver 4 determining whether an incremental rendering operation is being performed.

To do this, the driver 4 considers the graphics API calls from the application 2 that is requiring the render output, and identifies whether those calls include calls that indicate that an incremental rendering operation is being performed (or not). If the driver determines that an incremental rendering operation is being performed, then it includes appropriate conditional tasks (of the form discussed above) to control the incremental rendering operation by the graphics processing pipeline.

Thus, as shown in FIG. 5, the process starts with the application 2 issuing graphics API calls for a desired render output (frame) (step 51). The driver 4 receives and processes those API calls and converts them to appropriate hardware commands for the graphics processing pipeline 3 (step 52).

As part of this process, the driver identifies whether the processing for the frame begins with a frame buffer clear command or not (step 53).

If the frame does begin with a frame buffer clear command, then the driver identifies that the frame is being processed as "normal rendering" and so sets up, inter alia, a fragment processing command to clear each tile before processing the primitives in each tile (step 54).

On the other hand, if the processing for the frame does not begin with a frame buffer clear command, then that indicates that incremental rendering is being performed. In response to this, the driver includes in the fragment processing commands appropriate commands to cause the graphics processing pipeline to use the conditional pre-frame shaders discussed above to load the previous frame buffer contents into each tile before the tile is processed (step 55).

FIGS. 6 and 7 show in more detail the operation of steps 53, 54 and 55 in FIG. 5.

FIG. 6 shows the driver operation for setting the conditional task (pre-frame shader) that loads the previous frame's depth values for use when incremental rendering.

As shown in FIG. 6, the driver determines if the depth buffer is cleared for the frame being generated (step 60).

If the depth buffer is to be cleared, then the driver identifies that "normal" rendering is taking place, and so sets up a fragment processing command to clear the depth values for a tile before primitives for the tile are processed (step 61).

On the other hand, if the depth buffer is not being cleared, then the driver identifies that incremental rendering is being performed, and so sets up a fragment processing command to use a pre-frame shader conditional task that operates to load the appropriate depth buffer contents from memory into the depth buffer for a tile when the condition that "real" geometry to be processed for the incremental rendering operation intersects the tile in question is met (step 62).

This then has the effect that the background frame's depth buffer values will be loaded from memory for the incremental rendering operation for a tile if there is some "real" geometry (i.e. in the present example some part of the object 40) that falls to be rendered for the tile in question for the incremental rendering operation, but if no "real" geometry for the incremental rendering operation (i.e. no part of the object 40) intersects (falls at least partially within) the tile in question, then the depth buffer contents for the background frame will not be loaded into the graphics processing pipeline (thereby saving on that operation in that event).

FIG. 7 shows the driver operation for setting the conditional task that loads the previous frame's colour values for use when incremental rendering.

As shown in FIG. 7, the driver determines if the colour buffer is cleared for the frame being generated (step 70).

If the colour buffer is to be cleared, then the driver identifies that "normal" rendering is taking place, and so sets up a fragment processing command to clear the colour values for a tile before primitives for the tile are processed (step 71).

On the other hand, if the colour buffer is not being cleared, then the driver identifies that incremental rendering is being performed, and so sets up a fragment processing command to use a pre-frame shader conditional task that operates to load the appropriate colour buffer contents from memory into the colour buffer for a tile when the condition that a fragment for "real" geometry to be processed for the incremental rendering operation for the tile in question passes the early fragment tests is met (step 72).

This then has the effect that the background frame's colour buffer values will be loaded from memory for the incremental rendering operation for a tile if fragments for some "real" geometry (i.e. in the present example some part of the object 40) that falls to be rendered for the tile in question for the incremental rendering operation pass the early fragments tests, but if no fragments for "real" geometry for the incremental rendering operation (i.e. no fragments for the object 40) pass the early fragment tests (i.e. reach the rendering operation) (fall to be rendered) for the tile in question, then the colour buffer contents for the background frame will not be loaded into the graphics processing pipeline (thereby saving on that operation in that event).

FIGS. 8, 9 and 10 show the corresponding operation of the graphics processing pipeline 3 in response to the conditional tasks (pre-frame shaders) that are sent by the driver 3 when an incremental rendering operation is to be performed. FIG. 8 shows the operation in respect of the pre-frame shader (conditional task) that loads the depth values for a tile, and FIGS. 9 and 10 show alternative embodiments of the operation of the graphics processing pipeline in respect of the pre-frame shader (conditional task) that loads the colour values for the tile.

FIGS. 8, 9 and 10 show the operation in respect of any given tile for the render output. These operations will correspondingly be repeated for each tile to be processed to generate the render output.

As shown in FIG. 8, the processing of a tile starts with the primitive list reader 20 reading primitives to be processed from the primitive list for the tile in question from memory (step 81).

It is then determined whether any "real" (non-conditional) primitive to be processed for the incremental rendering operation (i.e. for the new object 40 to be rendered) intersects the tile in question (step 82). This is determined by identifying whether or not the primitive list for the tile includes a primitive to be processed for the new object 40 (i.e. whether a primitive representing "real" (non-conditional) geometry is to be processed for the tile or not). If there are no "real" primitives that intersect the tile, then the tile does not need to be processed for the incremental rendering operation (step 83) and the process moves on to the next tile.

On the other hand, if any primitives for "real" geometry do intersect the tile (i.e. need to be processed for the tile), then it is determined whether the set of tasks to be processed for the tile include any conditional tasks (pre-frame shaders) that include an "intersect" condition (step 84). If not, then the primitive list reader 20 can act simply to pass the "real" primitives that intersect the tile onto the rasteriser 21 for "standard" processing (step 85).

On the other hand, if the set of tasks for the tile includes a conditional pre-frame shader that has an "intersect" condition, then as the intersect condition is met (i.e. a "real" (non-conditional) primitive intersects the tile), the primitive list reader 20 first emits a full tile primitive (rectangle) for the pre-frame shader in question to the rasteriser 21 for rasterisation, and then passes the primitives for the "real" geometry (i.e. relating to the new object 40) to be processed to the rasteriser thereafter (step 86).

In the present example, there will, as discussed above, be, in order to perform the incremental rendering operation, a conditional pre-frame shader (task) that has an intersect condition associated with it and that is operable to load depth values for the background (previous) frame 30 for the tile when the "intersect" condition is met.

Thus, for those tiles where "real" geometry for the incremental rendering operation (i.e. a primitive for the new object 40 to be rendered) intersects the tile in question, the pre-frame shader that loads the depth values will be executed.

To load the previous (background) frame depth values, the processing operation that the conditional pre-frame shader that has the "intersect" condition executes is to load for each sampling position of the tile, the appropriate depth value from the background (previous) frame. This is achieved by rasterising the full tile primitive for the pre-frame shader in the rasteriser 21 to appropriate fragments that cover the entire tile, with the rendering (fragment shading) operation for those fragments for the pre-frame shader primitive then operating to load the relevant depth values from the background (previous) frame into the depth buffer for the tile being processed. As the primitive for the conditional pre-frame shader is issued to the rasteriser 21 before the primitives for the "real" geometry (i.e. relating to the new object 40), this loads the depth values for the background frame into the depth buffer before the "real" geometry for the tile is subjected to the depth test.

This has the effect then that if some geometry for the new object 40 to be rendered falls within a tile, the primitive for the conditional pre-frame shader will operate to load the depth values from the previous frame into the graphics processing pipeline before the primitives for the new object 40 are processed, such that those previous frame depth values are available to use in the early fragment test 22 when determining whether the new object 40 will be seen in the tile in question or not (will be in front of the geometry in the background frame for the tile in question or not). The early depth test 22 for the new object 40 for the incremental rendering for the tile in question can then be appropriately performed (and will give the correct result).

(If no primitives for the "real" geometry for the new object 40 fall within the tile, then the conditional pre-frame shader that loads the depth values will not run (as its "intersect" condition will not be met), and therefore the reading of the background (previous) frame depth values will not take place for the tile in question, thereby saving on that operation for those tiles where there is no "real" (i.e. non-conditional) geometry to be processed.)

The effect of the operation of the graphics processing pipeline 3 shown in FIG. 8 is that if "real" geometry falls to be processed for a tile for the incremental rendering operation, then the full-tile primitive for the pre-frame conditional shader having the "intersect" condition that operates to load the depth values for the background (previous) frame that the incremental rendering is to be applied is passed by the primitive list reader to the rasteriser 21 and will be rasterised and rendered first (thereby loading the depth values from the previous frame into the depth buffer for the tile), with the primitives for the draw call that is to render the incremental geometry (in this case the new object 40) then being issued by the primitive list reader 20 to the rasteriser 21 thereafter.

The primitives for the new object 40 will then be rasterised by the rasteriser 21 in the normal manner, with the fragments for that "real" geometry produced by the rasteriser 21 then subjected to the early fragment tests, and in particular to an early depth test, at the early fragment test stage 22. This early depth test will compare the depth value for the fragment for the new object 40 to the depth value for the previous frame that has already been loaded into the depth buffer for the tile by the first conditional task having the "intersect" condition. In this way, the early fragment test 22 (and in particular the early depth test) can operate correctly in respect of primitives and fragments for the new object 40 that is being incrementally rendered onto the previous (background) frame 30.

If a fragment for the new object 40 fails the early depth test at the early fragment stage 22 (i.e. is determined to be behind the background (previous) frame), then the fragment will be discarded from further processing in the normal manner for the graphics processing pipeline in question.

On the other hand, if the fragment for the new object 40 passes the early fragment test 22, then it will be passed onwards in the pipeline for rendering.

In this case, because the rendering operation is an incremental rendering operation, the colour values for the previous (background) frame 30 that the new object 40 is to be incrementally rendered onto will be needed by the graphics processing pipeline in order to be able to perform the incremental rendering operation (i.e. the rendering of the fragments for the new object 40) correctly. As discussed above, this is facilitated by having a second conditional pre-frame shader that is operable to, where required, load the colour values for the previous (background) frame 30 into the colour buffer for a tile being processed before the fragments for the "real" geometry for the incremental rendering operation (i.e. for the new object 40 in the present example) need that colour data.

Two examples of how this operation is achieved in the graphics processing pipeline 3 in the present embodiments will now be described with reference to FIGS. 9 and 10. FIG. 9 shows one embodiment of this operation, and FIG. 10 shows an alternative embodiment.

As shown in FIG. 9, the relevant operation of the graphics processing pipeline 3 starts when a fragment to be rendered for the "real" geometry (thus a fragment for the new object 40) for the tile in question passes the early fragment test 22. At this point in the embodiment shown in FIG. 9 it is first determined whether there are any more fragments from "real" geometry to be processed for the tile (step 90). This can be determined, for example, by tracking each fragment position in the tile to determine whether a fragment has been issued for that fragment position, for example by using a bit vector or a bitmap that represents each fragment position in the tile.

If at step 90 it is determined that there are more fragments to be processed for the tile, then at step 91 it is determined whether the fragment in question is the first "real" geometry fragment at the position in the tile in question. If not (i.e. a "real" fragment has already passed for the position in question), then the new fragment is simply sent to the fragment queue 23 to be queued for fragment shading 24.

On the other hand, if the fragment in question is the first "real" geometry fragment for the tile position in question, then it is determined whether the rendering operation (fragment shading operation) that the fragment is to be subjected to uses (depends on) the colour value for the tile position or positions in question stored in the tile buffer (this will, e.g., be the case if the fragment is to be blended with the existing tile colour buffer values) (step 92). If not (i.e. if the value(s) that the fragment will write to the colour buffer does not depend on the existing value(s) in the colour buffer), then again the fragment is simply sent to the fragment queue 23 for queuing for sending to the fragment shading stage 24.

On the other hand, if it is determined at step 92 that the processing of the fragment will use the current tile colour buffer value(s), it is then determined whether the set of tasks to be processed for the tile includes any conditional tasks (pre-frame shaders) that include a "fragments" condition (i.e. require a fragment for non-conditional geometry to be processed for the tile to pass the early fragment test 22) (step 93). If not, then again the fragment in question is simply passed to the fragment queue 23 for queuing for sending to the fragment shading stage 24.

On the other hand, if the set of tasks for the tile includes a conditional pre-frame shader that has a "fragments" condition, then as the fragment condition is met (i.e. a "real" non-conditional) fragment for a primitive has passed the early fragment test 22, then that "fragments" conditional pre-frame shader is triggered.

In the present example, there will, as discussed above, be, in order to perform the incremental rendering operation, a conditional pre-frame shader (task) that has a "fragments" condition associated with it and that is operable to load colour values for the background (previous) frame 30 for the tile when the "fragments" condition is met.

Thus, for those tiles where fragments for "real" geometry for the incremental rendering operation (i.e. for a primitive for the new object 40 to be rendered) pass the early fragment tests 22, the pre-frame shader that loads the colour values will be executed.

To load the previous (background) frame colour values, the processing operation that the conditional pre-frame shader that has the "fragments" condition executes is to load for each sampling position of the tile, the appropriate colour value from the background (previous) frame 30. This is achieved by issuing appropriate fragments that together cover the entire tile to the fragment shader 24, with the rendering (fragment shading) operation for those fragments for the pre-frame shader then operating to load the relevant colour values from the background (previous) frame into the colour buffer for the tile being processed.

To do this the primitive list reader 20 causes a pre-frame fragment for the pre-frame shader in question to be emitted at the tile position for the "real" fragment, before (in front of) the actual fragment for the "real" geometry (i.e. relating to the new object 40) (step 94). The fragments are issued to the fragment queue 23 such that there will be in the fragment queue 23 a fragment for the conditional pre-frame shader first, followed by the fragment for the "real" geometry (i.e. relating to the new object 40) for the sampling position or positions in the tile in question.

These fragments are then issued from the queue 23 to the fragment shader 24 in turn, such that the pre-frame shader fragment will operate to load the colour values from the previous (background) frame 30 for the fragment position in question before the "real" geometry fragment (for the new primitive 40) is rendered using, inter alia, the loaded colour values. (As the fragment for the conditional pre-frame shader is issued to the fragment shader 24 before the fragment for the "real" geometry (i.e. relating to the new object 40), this loads the colour values for the background frame into the colour buffer before the "real" fragment for the tile is rendered.)

This has the effect then that if a fragment (or fragments) for the new object 40 to be rendered passes the early fragment tests for a tile, fragments for the conditional pre-frame shader will operate to load the colour values from the previous frame into the graphics processing pipeline before the fragments for the new object 40 are processed, such that those previous frame colour values are available to use when rendering (fragment shading) the fragments for the new object 40. The rendering of the new object 40 for the tile in question can thus be appropriately performed (and will give the correct result).

(If no fragments for the "real" geometry for the new object 40 pass the early fragment tests for the tile, then the conditional pre-frame shader that loads the colour values will not run (as its "fragments" condition will not be met), and therefore the reading of the background (previous) frame colour values will not take place for the tile in question, thereby saving on that operation for those tiles where there is no "real" (i.e. non-conditional) geometry to be processed.)

As shown in FIG. 9, if at step 90 it is determined that the final fragment for "real" geometry for the tile has been reached, it is then determined whether a pre-frame conditional task (shader) having the "fragments" condition is present for the tile. If so, the primitive list reader 20 operates to emit fragments for the relevant pre-frame shader conditional task for all locations in the tile that pre-frame shader fragments have not yet been emitted for (step 95). The so-emitted pre-frame conditional shader fragments are again sent to the queue 23 for sending to the fragment shading stage 24. (To facilitate this, the graphics processing pipeline tracks whether a pre-frame conditional shader fragment has been issued for each fragment location in a tile, e.g. by using a bitmap or bit vector for each fragment position in the tile as discussed above.)

The effect of the arrangement shown in FIG. 9 is to emit a fragment for a conditional pre-frame shader that has a "fragments" condition a fragment at a time, as and when a given position in a tile falls to be processed.

FIG. 10 shows an alternative arrangement in which all the fragments for the conditional pre-frame shader that has the "fragments" condition (thus in this example that loads the colour values) are issued to the fragment queue 23 as soon as one fragment for "real" geometry (thus in this case for a primitive for the new object 40) passes the early fragment test 22.

As shown in FIG. 10, the relevant operation of the graphics processing pipeline 3 again starts when a fragment to be rendered for the "real" geometry (thus a fragment for the new object 40) for the tile in question passes the early fragment test 22. At this point it is first determined at step 100 whether the fragment in question is the first "real" geometry fragment for the tile in question. If not (i.e. a "real" fragment has already passed for the tile), then the new fragment is simply sent to the fragment queue 23 to be queued for fragment shading 24.

On the other hand, if the fragment in question is the first "real" geometry fragment for the tile, then it is determined whether the set of tasks to be processed for the tile includes any conditional tasks (pre-frame shaders) that include a "fragments" condition (i.e. require a fragment for non-conditional geometry to be processed for the tile to pass the early fragment test 22) (step 102). If not, then again the fragment in question is simply passed to the fragment queue 23 for queuing for sending to the fragment shading stage 24.

On the other hand, if the set of tasks for the tile includes a conditional pre-frame shader that has a "fragments" condition, then as the fragment condition is met (i.e. a "real" non-conditional) fragment for a primitive has passed the early fragment test 22, then that "fragments" conditional pre-frame shader is triggered.

In the present example, there will, as discussed above, be, in order to perform the incremental rendering operation, a conditional pre-frame shader (task) that has a "fragments" condition associated with it and that is operable to load colour values for the background (previous) frame 30 for the tile when the "fragments" condition is met.

Thus, for those tiles where fragments for "real" geometry for the incremental rendering operation (i.e. for a primitive for the new object 40 to be rendered) pass the early fragment tests 22, the pre-frame shader that loads the colour values will be executed.

Again, to load the previous (background) frame colour values, the processing operation that the conditional pre-frame shader that has the "fragments" condition executes is to load for each sampling position of the tile, the appropriate colour value from the background (previous) frame 30. This is again achieved by issuing appropriate fragments that together cover the entire tile to the fragment shader 24, with the rendering (fragment shading) operation for those fragments for the pre-frame shader then operating to load the relevant colour values from the background (previous) frame into the colour buffer for the tile being processed.

To do this, in the arrangement shown in FIG. 10 the primitive list reader 20 causes pre-frame fragments for the pre-frame shader in question to be emitted at (for) all positions in the tile, before (in front of) the actual fragment for the "real" geometry (i.e. relating to the new object 40) (step 103). The fragments are issued to the fragment queue 23 such that there will be in the fragment queue 23 all the fragments for the conditional pre-frame shader first, followed by the fragment for the "real" geometry (i.e. relating to the new object 40) for the sampling position or positions in the tile in question.

The effect of this then is that all the fragments for the conditional pre-frame shader that is to load the colour values are added to the fragment queue 23 at once, rather than one at a time as "real" geometry fragments fall to be processed (as is the case for the process shown in FIG. 9).

These fragments are then issued from the queue 23 to the fragment shader 24 in turn, such that the pre-frame shader fragments will operate to load the colour values from the previous (background) frame 30 for the tile before the "real" geometry fragment (for the new primitive 40) is rendered using, inter alia, the loaded colour values.

This again has the effect then that if a fragment for the new object 40 to be rendered passes the early fragment tests for a tile, fragments for the conditional pre-frame shader will operate to load the colour values from the previous frame into the graphics processing pipeline before the fragments for the new object 40 are processed, such that those previous frame colour values are available to use when rendering (fragment shading) the fragments for the new object 40. The rendering of the new object 40 for the tile in question can thus be appropriately performed (and will give the correct result).

(If no fragments for the "real" geometry for the new object 40 pass the early fragment tests for the tile, then the conditional pre-frame shader that loads the colour values will not run (as its "fragments" condition will not be met), and therefore the reading of the background (previous) frame colour values will not take place for the tile in question, thereby saving on that operation for those tiles where there is no "real" (i.e. non-conditional) geometry to be processed.)

As shown in FIG. 10, in this embodiment the graphics processing pipeline is arranged such that fragments that are in the queue 23 can be "killed" (discarded) if they will be overwritten by other, later fragments (step 104). This can be used to avoid processing, inter alia, conditional task fragments that are in the queue 23 but that in fact will not be needed.

This operation is achieved using the mechanism described in the Applicant's earlier UK Patent Application GB-A-2511177.

Thus, when a fragment for a task passes the early fragment tests 22, its position is broadcast to the fragment queue 23, and the fragment queue 23 is operable to use that position information for the fragment that passed the early fragment test is to determine if any fragments in the queue 23 will be overdrawn by the fragment that passed the early fragment test 22, and to, if any such fragments exist, selectively stop further processing of those overdrawn fragments (remove them from the queue).

FIG. 10 shows the decision to inject the whole tile's worth of conditional pre-frame shader fragments being made when the first "real" geometry fragment in the tile passes the early fragment test 22 (and thus triggers the "fragments" condition).

However, other arrangements would be possible. For example, the decision to inject the whole tile's worth of pre-frame shader fragments could be made in the rasteriser 21 or the primitive list reader 20 if desired. In this case, the "fragments condition" can be and is, in an embodiment, considered to be met for the purposes of injecting the pre-frame shader fragments if it is determined that the "real"

geometry for the render output for the tile has the potential to trigger the "fragments" condition, so as to avoid stalls for example.

In these cases, as the fragments for the conditional pre-frame shader are issued before it is determined whether the "fragments" condition for the task has definitely been met, the pre-frame shader fragments are held in the fragment queue 23 until such time as it is determined that the "fragments" condition has been met. To facilitate this, the fragments for the conditional task are marked as being "conditional" (e.g. using a flag or other marker) (and if the "fragments" condition is not met for the render output being generated, then the conditional fragments relating to the conditional task are removed from the fragment queue 23 without being further processed).

A number of changes, modifications and variations to the above-described embodiments would be possible, if desired.

For example, although in the above embodiments the processing operation for the conditional tasks comprises reading previously generated data values and storing them for use with a subsequent rendering operation, other arrangements would be possible. For example, the processing operation that a conditional task executes could also or instead comprise processing data that is generated by the graphics processing pipeline when generating a render output, such as, for example, filtering (e.g. downsampling), compressing or otherwise encoding, and/or averaging, data that is generated when generating the render output. This could be used, for example, to conditionally downsample or otherwise filter data that is generated when rendering a given render output, and may be as well as or instead of loading data, for example.

Similarly, the conditions that can be (and are) associated with a conditional task need not be limited to the particular conditions of the described embodiments.

For example, another condition that could be associated with a conditional task could be whether any geometry processed for a task other than the conditional task results in an output data value for that other task being generated (and, in an embodiment, stored). For example, it could be determined whether the depth and/or colour buffer is updated by a task other than the conditional task, and if the colour or depth buffer is updated, then the conditional task is triggered (but not otherwise) (or vice-versa).

In this case, the relevant output could be tracked to determine if an output is generated, for example, using a "dirty bits" arrangement.

It would also be possible, for example, to consider whether any output values from a (e.g. non-conditional) task are the same or not, and, e.g., only then trigger a conditional task if all the output values are not the same (or vice-versa).

It would also be possible to associate a conditional task with several conditions, such that the conditional task will only execute if all the selected conditions are met.

Also, although the above embodiments have been described in terms of the graphics processing pipeline handling individual fragments at a time, the pipeline could use alternative arrangements, such as processing groups of fragments (e.g. 2×2 fragment quads), or, indeed, individual sampling positions, if desired.

In an embodiment, the operation of the present embodiments is also combined with an arrangement that determines whether to write back the results of the rendering output which the conditional task relates to external memory (e.g. a frame buffer). In this case, if a conditional task to be executed when generating a tile of a render output is not in fact executed, then the tile write back mechanism to external memory for the tile that the conditional task relates to is not performed (is disabled). This can be used, for example, to avoid writing back tiles to external memory where there is in fact no update to the tile data actually being generated (which may arise, for example, in the case of incremental rendering where the incremental rendering is being done on a previous tile whose output has already been generated, and whose existing tile data isn't changed by the incremental rendering operation).

This can be implemented, e.g., by tracking whether the rendering output being generated for a tile has updated the tile buffer (such as the colour and/or depth buffer), and only triggering the writing back of the output tile to external memory if the tile buffer has been updated (e.g. by geometry for a non-conditional task).

Similarly, although the above embodiments have primarily been described with reference to incremental rendering, conditional tasks in the manner of the present embodiments can be used for any suitable and desired graphics processing operations and rendering output that is to be generated.

For example, it would also (or instead) be possible to have a conditional task that is to be executed after any "real" (non-conditional) geometry for a rendering output has been processed, e.g. with the condition for the conditional task being whether the "real" geometry results in any actual output values (e.g. updates the tile buffer for the tile in question). This could be used, for example, to perform post-processing operations, such as downsampling, filtering, or other processing on a generated render output. It could be used, for example, to perform multisampled rendering to a particular frame format, to run a shader (a shading program) on a rendered tile (a tile shader), etc.

In this case, the geometry (e.g. primitive(s), fragments, sampling positions) for the conditional task could be issued directly after (and only after) the other geometry that is to be processed has been issued to the graphics processing pipeline for processing.

Other arrangements would, of course, be possible.

It would also be possible to use only conditional tasks for generating a render output. This may be appropriate where, for example, only "simple" composition is required, such as displaying video with captions. For example, one or more conditional tasks could be used to load in appropriate data values to be processed, and then a post-processing conditional task used to, e.g., blend the loaded data in the desired manner.

It can be seen from the above that in a number of embodiments, the technology described herein comprises arrangements that can reduce the amount of ultimately unnecessary processing that may be performed by a graphics processing pipeline, at least for particular forms of rendering operation. This is achieved in some embodiments of the technology described herein at least, by attaching conditions to processing tasks to be performed by the graphics processing pipeline, with the graphics processing pipeline then only performing processing for the task in question when the condition or conditions associated with the task are met.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system that includes a graphics processing pipeline, the method comprising:
when the graphics processing pipeline is to generate a render output:
instructing the graphics processing pipeline to execute a conditional task that has associated with it a condition to be used by the graphics processing pipeline to determine whether to execute processing for the conditional task or not and a region of the render output over which the processing for the task will be executed when the condition for the conditional task is met;
the graphics processing pipeline determining whether the condition associated with the conditional task has been met; and
the graphics processing pipeline, when it determines that the condition associated with the conditional task has been met, executing the processing for the conditional task over the region of the render output associated with the task;
wherein the conditional task comprises at least one of:
a conditional task associated with a condition which is dependent upon a result of processing geometry for another task to be executed to generate the render output, the conditional task being operable, when the task's condition is met, to trigger the processing for the conditional task in advance of further processing of geometry for the task that triggered the conditional task; or
a conditional task associated with one or more of the following conditions:
whether any geometry that is to be processed for a non-conditional task that is to be executed when generating the render output falls at least partially within a region of the render output over which the condition for the conditional task is to be considered;
whether at least one fragment issued by a rasteriser of the graphics processing pipeline when rasterising geometry for a non-conditional task to be executed to generate the render output passes an early culling test that fragments issued by the rasteriser are to undergo in the graphics processing pipeline for a region of the render output over which the condition for the conditional task is to be considered; and
whether any geometry processed for a task other than a conditional task results in an output data value for that other task being generated and stored for a region of the render output over which the condition for the conditional task is to be considered.

2. The method of claim 1, wherein the graphics processing pipeline is a tile-based graphics processing pipeline and the render output region for the conditional task comprises a single tile that the graphics processing pipeline operates on.

3. The method of claim 1, wherein the processing that the conditional task performs comprises reading previously generated data values and storing them for use when generating the render output.

4. The method of claim 1, wherein the processing that the conditional task performs comprises processing data that is generated by the graphics processing pipeline when generating the render output.

5. The method of claim 1, wherein the conditional task is in the form of a shader that is to be executed by the graphics processing pipeline when the task's condition is met.

6. The method of claim 1, further comprising:
determining from graphics processing commands received from an application that requires graphics processing to generate a render output, whether to include a conditional graphics processing task in the graphics processing tasks that are to be executed by a graphics processing pipeline to generate the render output required by the application; and
when it is determined to include a conditional graphics processing task in the graphics processing tasks that are to be executed by a graphics processing pipeline to generate the render output required by the application, instructing a graphics processing pipeline to execute a set of one or more graphics processing tasks to cause the graphics processing pipeline to generate the render output required by the application, with at least one of the tasks in the set of tasks being a conditional task having associated with it a condition to be used by the graphics processing pipeline to determine whether to execute processing for the conditional task or not and a region of the render output over which the processing for the conditional task will be executed when the condition for the task is met.

7. The method of claim 1, further comprising:
instructing the graphics processing pipeline to execute a set of plural tasks to generate the render output, with only some but not all of the tasks in the set of plural tasks being conditional tasks.

8. The method of claim 1, further comprising:
when a conditional task to be executed when generating a render output is not executed, then not writing the rendering output that the conditional task relates to back to external memory.

9. The method of claim 1, wherein the render output that is being generated is an incrementally rendered frame.

10. The method of claim 1, wherein the condition associated with a conditional task is indicated in the instruction to execute the conditional task.

11. A method of providing tasks for generating a render output to a graphics processing pipeline, the method comprising:
determining from graphics processing commands received from an application that requires graphics processing to generate a render output, whether to include a conditional graphics processing task in the graphics processing tasks that are to be executed by a graphics processing pipeline to generate the render output required by the application; and
when it is determined to include a conditional graphics processing task in the graphics processing tasks that are to be executed by a graphics processing pipeline to generate the render output required by the application, instructing a graphics processing pipeline to execute a set of one or more graphics processing tasks to cause the graphics processing pipeline to generate the render output required by the application, with at least one of the tasks in the set of tasks being a conditional task having associated with it a condition to be used by the graphics processing pipeline to determine whether to execute processing for the conditional task or not and a region of the render output over which the processing for the conditional task will be executed when the condition for the task is met;
wherein the conditional task comprises at least one of:
a conditional task associated with a condition which is dependent upon a result of processing geometry for another task to be executed to generate the render output, the conditional task being operable, when the task's condition is met, to trigger the processing for the conditional task in advance of further processing of geometry for the task that triggered the conditional task; or
a conditional task associated with one or more of the following conditions:
whether any geometry that is to be processed for a non-conditional task that is to be executed when generating the render output falls at least partially within a region of the render output over which the condition for the conditional task is to be considered;
whether at least one fragment issued by a rasteriser of the graphics processing pipeline when rasterising geometry for a non-conditional task to be executed to generate the render output passes an early culling test that fragments issued by the rasteriser are to undergo in the graphics processing pipeline for a region of the render output over which the condition for the conditional task is to be considered; and
whether any geometry processed for a task other than a conditional task results in an output data value for that other task being generated and stored for a region of the render output over which the condition for the conditional task is to be considered.

12. A graphics processing pipeline comprising processing circuitry capable of:
when the graphics processing pipeline is instructed to execute a conditional task that has associated with it a condition to be used by the graphics processing pipeline to determine whether to execute processing for the conditional task or not and a region of the render output over which the processing for the conditional task will be executed when the condition for the conditional task is met:
determining whether the condition associated with the conditional task has been met; and
when it is determined that the condition associated with the conditional task has been met, triggering the execution of the processing for the conditional task over the region of the render output associated with the conditional task by the graphics processing pipeline;
wherein the conditional task comprises at least one of:
a conditional task associated with a condition which is dependent upon a result of processing geometry for another task to be executed to generate the render output, the conditional task being operable, when the task's condition is met, to trigger the processing for the conditional task in advance of further processing of geometry for the task that triggered the conditional task; or
a conditional task associated with one or more of the following conditions:
whether any geometry that is to be processed for a non-conditional task that is to be executed when generating the render output falls at least partially within a region of the render output over which the condition for the conditional task is to be considered;
whether at least one fragment issued by a rasteriser of the graphics processing pipeline when rasterising geometry for a non-conditional task to be executed to generate the render output passes an early culling test that fragments issued by the rasteriser are to undergo in the graphics processing pipeline for a region of the render output over which the condition for the conditional task is to be considered; and
whether any geometry processed for a task other than a conditional task results in an output data value for that other task being generated and stored for a region of the render output over which the condition for the conditional task is to be considered.

13. The pipeline of claim 12, wherein the graphics processing pipeline is a tile-based graphics processing pipeline and the render output region for the conditional task comprises a single tile that the graphics processing pipeline operates on.

14. The pipeline of claim 12, wherein the processing that the graphics processing pipeline performs for the conditional task comprises reading previously generated data values and storing them for use when generating the render output.

15. The pipeline of claim 12, wherein the processing that the graphics processing pipeline performs for the conditional task comprises processing data that is generated by the graphics processing pipeline when generating the render output.

16. The pipeline of any one of claim 12, wherein the conditional task is in the form of a shader that is to be executed by the graphics processing pipeline when the task's condition is met.

17. The pipeline of claim 12, further comprising processing circuitry capable of:
when a conditional task to be executed when generating a render output is not executed, then not writing the rendering output that the conditional task relates to back to external memory.

18. The pipeline of claim 12, wherein the render output is an incrementally rendered frame.

19. The pipeline of claim 12, wherein the graphics processing pipeline is a tile-based graphics processing pipeline.

20. An apparatus for providing tasks for generating a render output to a graphics processing pipeline, the apparatus comprising processing circuitry capable of:
determining from graphics processing commands received from an application that requires graphics processing to generate a render output, whether to include a conditional graphics processing task in the graphics processing tasks that are to be executed by a graphics processing pipeline to generate the render output required by the application; and of:
when it is determined to include a conditional graphics processing task in the graphics processing tasks that are to be executed by a graphics processing pipeline to generate the render output required by the application, instructing a graphics processing pipeline to execute a set of one or more graphics processing tasks to cause the graphics processing pipeline to generate the render output required by the application, with at least one of the tasks in the set of tasks being a conditional task having associated with it a condition to be used by the graphics processing pipeline to determine whether to execute processing for the conditional task or not and a region of the render output over which the processing for the conditional task will be executed when the condition for the task is met;

wherein the conditional task comprises at least one of:
a conditional task associated with a condition which is dependent upon a result of processing geometry for another task to be executed to generate the render output, the conditional task being operable, when the task's condition is met, to trigger the processing for the conditional task in advance of further processing of geometry for the task that triggered the conditional task; or a conditional task associated with one or more of the following conditions:
whether any geometry that is to be processed for a non-conditional task that is to be executed when generating the render output falls at least partially within a region of the render output over which the condition for the conditional task is to be considered;

whether at least one fragment issued by a rasteriser of the graphics processing pipeline when rasterising geometry for a non-conditional task to be executed to generate the render output passes an early culling test that fragments issued by the rasteriser are to undergo in the graphics processing pipeline for a region of the render output over which the condition for the conditional task is to be considered; and whether any geometry processed for a task other than a conditional task results in an output data value for that other task being generated and stored for a region of the render output over which the condition for the conditional task is to be considered.

21. The apparatus of claim 20, comprising processing circuitry capable of: instructing the graphics processing pipeline to execute a set of plural tasks to generate a render output, with only some but not all of the tasks in the set of plural tasks being conditional tasks.

22. A non-transitory computer readable medium storing computer software code which when executing on a data processor performs a method of providing tasks for generating a render output to a graphics processing pipeline, the method comprising:
determining from graphics processing commands received from an application that requires graphics processing to generate a render output, whether to include a conditional graphics processing task in the graphics processing tasks that are to be executed by a graphics processing pipeline to generate the render output required by the application; and when it is determined to include a conditional graphics processing task in the graphics processing tasks that are to be executed by a graphics processing pipeline to generate the render output required by the application, instructing a graphics processing pipeline to execute a set of one or more graphics processing tasks to cause the graphics processing pipeline to generate the render output required by the application, with at least one of the tasks in the set of tasks being a conditional task having associated with it a condition to be used by the graphics processing pipeline to determine whether to execute processing for the conditional task or not and a region of the render output over which the processing for the conditional task will be executed when the condition for the task is met;

wherein the conditional task comprises at least one of:
a conditional task associated with a condition which is dependent upon a result of processing geometry for another task to be executed to generate the render output, the conditional task being operable, when the task's condition is met, to trigger the processing for the conditional task in advance of further processing of geometry for the task that triggered the conditional task; or a conditional task associated with one or more of the following conditions:
whether any geometry that is to be processed for a non-conditional task that is to be executed when generating the render output falls at least partially within a region of the render output over which the condition for the conditional task is to be considered;

whether at least one fragment issued by a rasteriser of the graphics processing pipeline when rasterising geometry for a non-conditional task to be executed to generate the render output passes an early culling test that fragments issued by the rasteriser are to undergo in the graphics processing pipeline for a region of the render output over which the condition for the conditional task is to be considered; and whether any geometry processed for a task other than a conditional task results in an output data value for that other task being generated and stored for a region of the render output over which the condition for the conditional task is to be considered.

* * * * *